(12) United States Patent
Liu et al.

(10) Patent No.: US 9,147,888 B2
(45) Date of Patent: Sep. 29, 2015

(54) FUEL CELL SYSTEM WITH INTERCONNECT

(75) Inventors: Zhien Liu, Canton, OH (US); Richard Goettler, Medina, OH (US)

(73) Assignee: LG Fuel Cell Systems Inc., North Canton, OH (US)

( * ) Notice: Subject to any disclaimer, the term of this patent is extended or adjusted under 35 U.S.C. 154(b) by 21 days.

(21) Appl. No.: 13/161,384

(22) Filed: Jun. 15, 2011

(65) Prior Publication Data

US 2012/0321982 A1    Dec. 20, 2012

(51) Int. Cl.
*H01M 8/02* (2006.01)
*H01M 8/24* (2006.01)
*H01M 8/12* (2006.01)

(52) U.S. Cl.
CPC .......... *H01M 8/0202* (2013.01); *H01M 8/0217* (2013.01); *H01M 8/0247* (2013.01); *H01M 8/0256* (2013.01); *H01M 8/2425* (2013.01); *H01M 2008/1293* (2013.01); *Y02E 60/50* (2013.01); *Y02E 60/525* (2013.01)

(58) Field of Classification Search
CPC ............ H01M 8/0202; H01M 8/0217; H01M 8/0247; H01M 8/0256
USPC .................. 429/453, 465–466, 468
See application file for complete search history.

(56) References Cited

U.S. PATENT DOCUMENTS

| | | | |
|---|---|---|---|
| 4,663,250 A | 5/1987 | Ong et al. | |
| 4,888,254 A | 12/1989 | Reichner | |
| 5,175,061 A | 12/1992 | Hildebrandt et al. | |
| 5,273,837 A | 12/1993 | Aitken et al. | |
| 5,928,805 A | 7/1999 | Singh et al. | |
| 6,344,426 B1 | 2/2002 | Hata et al. | |
| 6,558,832 B1 | 5/2003 | Bruck et al. | |
| 6,623,881 B2 | 9/2003 | Badding et al. | |
| 6,638,658 B1 | 10/2003 | McLean | |
| 6,852,436 B2 | 2/2005 | Badding et al. | |
| 6,949,307 B2 | 9/2005 | Cable et al. | |
| 7,001,684 B2 | 2/2006 | Doshi et al. | |
| 7,285,350 B2 | 10/2007 | Keefer et al. | |

(Continued)

FOREIGN PATENT DOCUMENTS

| CN | 101849309 A | 9/2010 |
|---|---|---|
| EP | 0 876 687 B1 | 10/2002 |

(Continued)

OTHER PUBLICATIONS

M.R. Pillai, Dan Gostovic, Ilwon Kim, Scott A. Barnett, "Short-period Segmented-in-Series Solid Oxide Fuel Cells on Flattened Tube Supports" 163 (2007) 960.

(Continued)

*Primary Examiner* — Jonathan G Leong
*Assistant Examiner* — James Erwin
(74) *Attorney, Agent, or Firm* — Krieg DeVault LLP

(57) ABSTRACT

The present invention includes a fuel cell system having a plurality of adjacent electrochemical cells formed of an anode layer, a cathode layer spaced apart from the anode layer, and an electrolyte layer disposed between the anode layer and the cathode layer. The fuel cell system also includes at least one interconnect, the interconnect being structured to conduct free electrons between adjacent electrochemical cells. Each interconnect includes a primary conductor embedded within the electrolyte layer and structured to conduct the free electrons.

28 Claims, 18 Drawing Sheets

(56) References Cited

U.S. PATENT DOCUMENTS

| | | |
|---|---|---|
| 7,323,266 B2 | 1/2008 | Morishima et al. |
| 7,351,449 B2 | 4/2008 | Hunt et al. |
| 7,378,173 B2 | 5/2008 | Badding et al. |
| 7,381,492 B2 | 6/2008 | Chen et al. |
| 7,510,819 B2 | 3/2009 | Chen et al. |
| 7,531,260 B2 | 5/2009 | Day et al. |
| 7,632,587 B2 | 12/2009 | McLean et al. |
| 7,709,124 B2 | 5/2010 | Barnett et al. |
| 7,718,113 B2 | 5/2010 | Crumm et al. |
| 7,732,002 B2 | 6/2010 | Kodas et al. |
| 7,781,109 B2 | 8/2010 | Gross |
| 7,842,434 B2 | 11/2010 | Rakowski et al. |
| 2002/0102450 A1 | 8/2002 | Badding et al. |
| 2004/0023101 A1 | 2/2004 | Jacobson et al. |
| 2004/0028975 A1 | 2/2004 | Badding et al. |
| 2004/0106031 A1 | 6/2004 | Sherman et al. |
| 2005/0014049 A1 | 1/2005 | Hart et al. |
| 2005/0221138 A1 | 10/2005 | Chinchure et al. |
| 2005/0227134 A1 | 10/2005 | Nguyen |
| 2005/0249993 A1* | 11/2005 | Horiuchi et al. ............ 429/32 |
| 2005/0250004 A1 | 11/2005 | McLean et al. |
| 2006/0029860 A1* | 2/2006 | Ketcham et al. ............ 429/209 |
| 2006/0153974 A1 | 7/2006 | Matsuzaki et al. |
| 2007/0037031 A1 | 2/2007 | Cassidy et al. |
| 2007/0072070 A1 | 3/2007 | Quek et al. |
| 2007/0087250 A1 | 4/2007 | Lewis et al. |
| 2007/0134537 A1 | 6/2007 | Reisdorf et al. |
| 2007/0259242 A1 | 11/2007 | Schaevitz et al. |
| 2008/0124602 A1 | 5/2008 | Larsen et al. |
| 2008/0160376 A1 | 7/2008 | Badding et al. |
| 2008/0199738 A1 | 8/2008 | Perry et al. |
| 2009/0011307 A1 | 1/2009 | Lee et al. |
| 2009/0035635 A1 | 2/2009 | Bae et al. |
| 2009/0162735 A1 | 6/2009 | Hasegawa |
| 2010/0035101 A1 | 2/2010 | Maier et al. |
| 2010/0055533 A1 | 3/2010 | Kebbede et al. |
| 2010/0209802 A1 | 8/2010 | Armstrong et al. |
| 2011/0033779 A1 | 2/2011 | Badding et al. |
| 2012/0244456 A1 | 9/2012 | Muecke et al. |
| 2012/0258241 A1 | 10/2012 | Tucker et al. |
| 2012/0321981 A1 | 12/2012 | Liu |
| 2014/0017596 A1 | 1/2014 | Takata |

FOREIGN PATENT DOCUMENTS

| | | |
|---|---|---|
| EP | 1 304 755 B1 | 4/2003 |
| EP | 1 230 706 B1 | 3/2004 |
| EP | 0 815 607 B1 | 5/2004 |
| EP | 1624521 A1 | 2/2006 |
| EP | 1 472 754 B1 | 8/2006 |
| EP | 1852930 A1 | 11/2007 |
| WO | WO 99/57780 A1 | 11/1999 |
| WO | WO 02/29917 A1 | 4/2002 |
| WO | WO 03/063285 A1 | 7/2003 |
| WO | 2008091801 A2 | 7/2008 |
| WO | WO 2008/103253 A1 | 8/2008 |
| WO | WO 2009008979 A1 * | 1/2009 |
| WO | 2012133263 A1 | 10/2012 |

OTHER PUBLICATIONS

T.S. Lai, S.A. Barnett, "Design Considerations for Segmented-in-Series Fuel Cell", J. Power Sources 147(2005)85.

International Search Report and Written Opinion, PCT/US12/42051, Rolls-Royce Fuel Cell Systems (US) Inc., Sep. 7, 2012.

International Search Report and Written Opinion, PCT/US12/42062, Rolls-Royce Fuel Cell Systems (US) Inc., Aug. 31, 2012.

International Search Report and Written Opinion, PCT/US12/42073, Rolls-Royce Fuel Cell Systems (US) Inc., Sep. 4, 2012.

International Search Report and Written Opinion, PCT/US12/42066, Rolls-Royce Fuel Cell Systems (US) Inc., Aug. 31, 2012.

International Search Report and Written Opinion, PCT/US12/42070, Rolls-Royce Fuel Cell Systems (US) Inc., Sep. 4, 2012.

Q. X. Fu et al. "LA$_{0.4}$SR$_{0.6}$ti$_{1-x}$Mn$_x$O$_{3-[delta]}$ Perovskites as Anode Materials for Solide Oxide Fuel Cells", Abstract, Journal of the Electrochemical Society, vol. 1523, No. 4, Feb. 24, 2006, (20069-02-24), 1 pg.

International Search Report and Written Opinion, ISAEPO, PCT/US2014/029782, LG Fuel Cell Systems Inc., Jul. 28, 2014, 11 pgs.

International Search Report and Written Opinion, ISAEPO, PCT/US2014/029705, LG Fuel Cell Systems Inc., Jun. 5, 2014, 13 pgs.

Electrochem, Solid-State Lett. 2006 9, 4, A215-A219 (abstract).

First Office Action, Jun. 30, 2015, pp. 1-26, Chinese Patent Application No. 201280037148.1, Chinese Patent Office, China.

\* cited by examiner

US 9,147,888 B2

FUEL CELL SYSTEM WITH INTERCONNECT

GOVERNMENT RIGHTS

This invention was made with U.S. Government support under Contract No. DE-FE0000303 awarded by the Department of Energy. The Government has certain rights in this invention.

FIELD OF THE INVENTION

The present invention generally relates to fuel cells and, in particular, to an interconnect for a fuel cell.

BACKGROUND

Fuel cells, fuel cell systems and interconnects for fuel cells and fuel cell systems remain an area of interest. Some existing systems have various shortcomings, drawbacks, and disadvantages relative to certain applications. Accordingly, there remains a need for further contributions in this area of technology.

SUMMARY

The present invention includes a fuel cell system having an interconnect that reduces or eliminates diffusion (leakage) of fuel and oxidant by providing an increased diffusion distance and reduced diffusion flow area.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
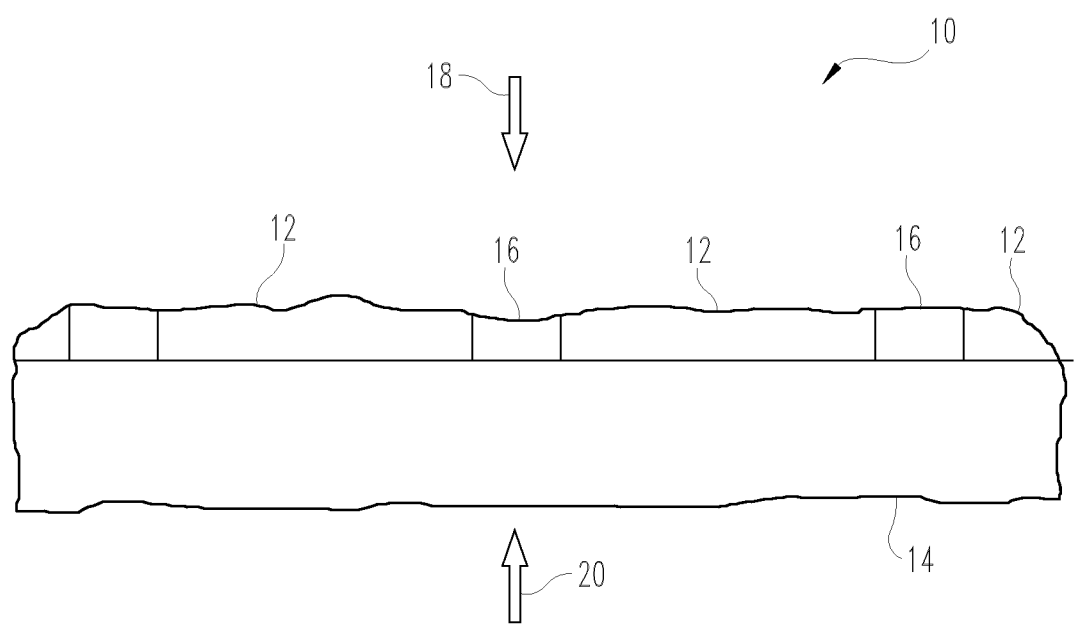
FIG. 1 schematically depicts some aspects of a non-limiting example of a fuel cell system in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, some aspects of a non-limiting example of a fuel cell system 10 in accordance with an embodiment of the present invention is schematically depicted. In the embodiment of FIG. 1, various features, components and interrelationships therebetween of aspects of an embodiment of the present invention are depicted. However, the present invention is not limited to the particular embodiment of FIG. 1 and the components, features and interrelationships therebetween as are illustrated in FIG. 1 and described herein.

The present embodiment of fuel cell system 10 includes a plurality of electrochemical cells 12, i.e., individual fuel cells, formed on a substrate 14. Electrochemical cells 12 are coupled together in series by interconnects 16. Fuel cell system 10 is a segmented-in-series arrangement deposited on a flat porous ceramic tube, although it will be understood that the present invention is equally applicable to segmented-in-series arrangements on other substrates, such on a circular porous ceramic tube. In various embodiments, fuel cell system 10 may be an integrated planar fuel cell system or a tubular fuel cell system.

Each electrochemical cell 12 of the present embodiment has an oxidant side 18 and a fuel side 20. The oxidant is typically air, but could also be pure oxygen ($O_2$) or other oxidants, e.g., including dilute air for fuel cell systems having air recycle loops, and is supplied to electrochemical cells 12 from oxidant side 18. Substrate 14 of the present embodiment is porous, e.g., a porous ceramic material which is stable at fuel cell operation conditions and chemically compatible with other fuel cell materials. In other embodiments, substrate 14 may be a surface-modified material, e.g., a porous ceramic material having a coating or other surface modification, e.g., configured to prevent or reduce interaction between electrochemical cell 12 layers and substrate 14. A fuel, such as a reformed hydrocarbon fuel, e.g., synthesis gas, is supplied to electrochemical cells 12 from fuel side 20 via channels (not shown) in porous substrate 14. Although air and synthesis gas reformed from a hydrocarbon fuel are employed in the present embodiment, it will be understood that electrochemical cells using other oxidants and fuels may be employed without departing from the scope of the present invention, e.g., pure hydrogen and pure oxygen. In addition, although fuel is supplied to electrochemical cells 12 via substrate 14 in the present embodiment, it will be understood that in other embodiments of the present invention, the oxidant may be supplied to the electrochemical cells via a porous substrate.

Figure 2:
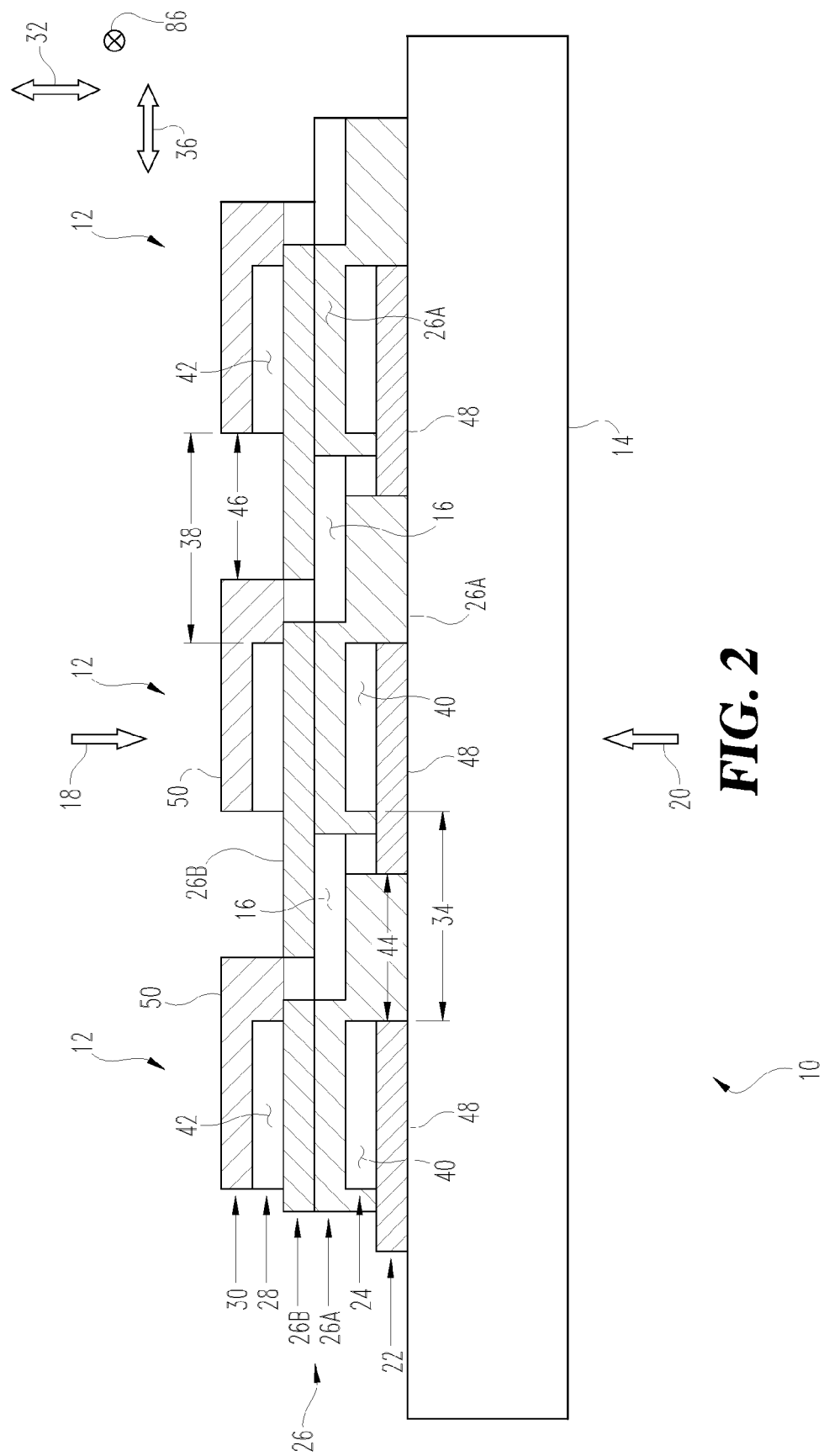
FIG. 2 schematically depicts some aspects of a non-limiting example of a cross section of a fuel cell system in accordance with an embodiment of the present invention.

Referring to FIG. 2, some aspects of a non-limiting example of fuel cell system 10 are described in greater detail. Fuel cell system 10 can be formed of a plurality of layers screen printed onto substrate 14. Screen printing is a process whereby a woven mesh has openings through which the fuel cell layers are deposited onto substrate 14. The openings of the screen determine the length and width of the printed layers. Screen mesh, wire diameter, ink solids loading and ink rheology determine the thickness of the printed layers. Fuel cell system 10 layers include an anode conductive layer 22, an anode layer 24, an electrolyte layer 26, a cathode layer 28 and a cathode conductive layer 30. In one form, electrolyte layer 26 is formed of an electrolyte sub-layer 26A and an electrolyte sub-layer 26B. In other embodiments, electrolyte layer 26 may be formed of any number of sub-layers. It will be understood that FIG. 2 is not to scale; for example, vertical dimensions are exaggerated for purposes of clarity of illustration.

Interconnects for solid oxide fuel cells (SOFC) are preferably electrically conductive in order to transport electrons from one electrochemical cell to another; mechanically and chemically stable under both oxidizing and reducing environments during fuel cell operation; and nonporous, in order to prevent diffusion of the fuel and/or oxidant through the interconnect. If the interconnect is porous, fuel may diffuse to the oxidant side and burn, resulting in local hot spots that may result in a reduction of fuel cell life, e.g., due to degradation of materials and mechanical failure, as well as reduced efficiency of the fuel cell system. Similarly, the oxidant may diffuse to the fuel side, resulting in burning of the fuel. Severe interconnect leakage may significantly reduce the fuel utilization and performance of the fuel cell, or cause catastrophic failure of fuel cells or stacks.

For segmented-in-series cells, fuel cell components may be formed by depositing thin films on a porous ceramic substrate, e.g., substrate 14. In one form, the films are deposited via a screen printing process, including the interconnect. In other embodiments, other process may be employed to deposit or otherwise form the thin films onto the substrate. The thickness of interconnect layer may be 5 to 30 microns, but can also be much thicker, e.g., 100 microns. If the interconnect is not fully nonporous, e.g., due to sintering porosity, microcracks, voids and other defects introduced during processing, gas or air flux through interconnect layer may be very high, resulting in undesirable effects, as mentioned above. Accordingly, in one aspect of the present invention, the interconnect (interconnect 16) is configured to minimize or eliminate diffusion of the oxidant and fuel therethrough.

The material of interconnect 16 of the present embodiment is a precious metal, such as Ag, Pd, Au and/or Pt and/or alloys thereof, although other materials may be employed without departing from the scope of the present invention. For example, in other embodiments, it is alternatively contemplated that other materials may be employed, including precious metal alloys, such as Ag—Pd, Ag—Au, Ag—Pt, Au—Pd, Au—Pt, Pt—Pd, Ag—Au—Pd, Ag—Au—Pt, Ag—Au—Pd—Pt and/or binary, ternary, quaternary alloys in the Pt—Pd—Au—Ag family, inclusive of alloys having minor non-precious metal additions, cermets composed of a precious metal, precious metal alloy, Ni metal and/or Ni alloy and an inert ceramic phase, such as alumina, or ceramic phase with minimum ionic conductivity which will not create significant parasitics, such as YSZ (yttria stabilized zirconia, also known as yttria doped zirconia, yttria doping is 3-8 mol %, preferably 3-5 mol %), ScSZ (scandia stabilized zirconia, scandia doping is 4-10 mol %, preferably 4-6 mol %), and/or conductive ceramics, such as conductive perovskites with A or B-site substitutions or doping to achieve adequate phase stability and/or sufficient conductivity as an interconnect, e.g., including at least one of LNF ($LaNi_xFe_{1-x}O_3$, preferably x=0.6), LSM ($La_{1-x}Sr_xMnO_3$, x=0.1 to 0.3), doped ceria, doped strontium titanate (such as $La_xSr_{1-x}TiO_{3-\delta}$, x=0.1 to 0.3) LSCM ($La_{1-x}Sr_xCr_{1-y}Mn_yO_3$, x=0.1 to 0.3 and y=0.25 to 0.75), doped yttrium chromites (such as $Y_{1-x}Ca_xCrO_{3-\delta}$, x=0.1-0.3) and/or other doped lanthanum chromites (such as $La_{1-x}Ca_xCrO_{3-\delta}$, x=0.15-0.3), and conductive ceramics, such as at least one of LNF ($LaNi_xFe_{1-x}O_3$, preferably x=0.6), LSM ($La_{1-x}Sr_xMnO_3$, x=0.1 to 0.3), doped strontium titanate, doped yttrium chromites, LSCM ($La_{1-x}Sr_xCr_{1-y}Mn_yO_3$), and other doped lanthanum chromites. In some embodiments, it is contemplated that all or part of interconnect 16 may be formed of a Ni metal cermet and/or a Ni alloy cermet in addition to or in place of the materials mentioned above. The Ni metal cermet and/or the Ni alloy cermet may have one or more ceramic phases, for example and without limitation, a ceramic phase being YSZ (yttria doping is 3-8 mol %, preferably 3-5 mol %), alumina, ScSZ (scandia doping is 4-10 mol %, preferably 4-6 mol %), doped ceria and/or $TiO_2$.

One example of materials for interconnect 16 is $y(Pd_xPt_{1-x})$-(1-y)YSZ. Where x is from 0 to 1 in weight ratio, preferably x is in the range of 0 to 0.5 for lower hydrogen flux. Y is from 0.35 to 0.80 in volume ratio, preferably y is in the range of 0.4 to 0.6.

Anode conductive layer 22 of the present embodiment is an electrode conductive layer formed of a nickel cermet, such as such as Ni—YSZ (yttria doping in zirconia is 3-8 mol %), Ni—ScSZ (scandia doping is 4-10 mol %, preferably second doping for phase stability for 10 mol % scandia-$ZrO_2$) and/or Ni-doped ceria (such as Gd or Sm doping), doped lanthanum chromite (such as Ca doping on A site and Zn doping on B site), doped strontium titanate (such as La doping on A site and Mn doping on B site) and/or $La_{1-x}Sr_xMn_yCr_{1-y}O_3$. Alternatively, it is considered that other materials for anode conductive layer 22 may be employed such as cermets based in part or whole on precious metal. Precious metals in the cermet may include, for example, Pt, Pd, Au, Ag, and/or alloys thereof. The ceramic phase may include, for example, an inactive non-electrically conductive phase, including, for example, YSZ, ScSZ and/or one or more other inactive phases, e.g., having desired coefficients of thermal expansion (CTE) in order to control the CTE of the layer to match the CTE of the substrate and electrolyte. In some embodiments, the ceramic phase may include $Al_2O_3$ and/or a spinel such as $NiAl_2O_4$, $MgAl_2O_4$, $MgCr_2O_4$, $NiCr_2O_4$. In other embodiments, the ceramic phase may be electrically conductive, e.g., doped lanthanum chromite, doped strontium titanate and/or one or more forms of LaSrMnCrO.

One example of anode conductive layer material is 76.5% Pd, 8.5% Ni, 15%3YSZ.

Anode 24 may be formed of xNiO-(100-x)YSZ (x is from 55 to 75 in weight ratio), yNiO-(100-y)ScSZ (y is from 55 to 75 in weight ratio), NiO-gadolinia stabilized ceria (such as 55 wt % NiO-45 wt % GDC) and/or NiO samaria stabilized ceria in the present embodiment, although other materials may be employed without departing from the scope of the present invention. For example, it is alternatively considered that anode layer 24 may be made of doped strontium titanate, and $La_{1-x}Sr_xMn_yCr_{1-y}O_3$. (such as $La_{0.75}Sr_{0.25}Mn_{0.5}Cr_{0.5}O_3$)

Electrolyte layer 26 of the present embodiment, e.g., electrolyte sub-layer 26A and/or electrolyte sub-layer 26B, may be made from a ceramic material. In one form, a proton and/or oxygen ion conducting ceramic, may be employed. In one form, electrolyte layer 26 is formed of YSZ, such as 3YSZ and/or 8YSZ. In other embodiments, electrolyte layer 26 may be formed of ScSZ, such as 4ScSZ, 6ScSz and/or 10ScSZ in addition to or in place of YSZ. In other embodiments, other materials may be employed. For example, it is alternatively considered that electrolyte layer 26 may be made of doped ceria and/or doped lanthanum gallate. In any event, electrolyte layer 26 is essentially impervious to diffusion therethrough of the fluids used by fuel cell 10, e.g., synthesis gas or pure hydrogen as fuel, as well as, e.g., air or $O_2$ as an oxidant, but allows diffusion of oxygen ions or protons.

Cathode layer 28 may be formed at least one of LSM ($La_{1-x}Sr_xMnO_3$, x=0.1 to 0.3), $La_{1-x}Sr_xFeO_3$, (such as x=0.3), $La_{1-x}Sr_xCo_yFe_{1-y}O_3$ (such as $La_{0.6}Sr_{0.4}Co_{0.2}Fe_{0.8}O_3$) and/or $Pr_{1-x}Sr_xMnO_3$ (such as $Pr_{0.8}Sr_{0.2}MnO_3$), although other materials may be employed without departing from the scope of the present invention. For example, it is alternatively considered that Ruddlesden-Popper nickelates and $La_{1-x}Ca_xMnO_3$ (such as $La_{0.8}Ca_{0.2}MnO_3$) materials may be employed.

Cathode conductive layer 30 is an electrode conductive layer formed of a conductive ceramic, for example, at least one of $LaNi_xFe_{1-x}O_3$ (such as $LaNi_{0.6}Fe_{0.4}O_3$), $La_{1-x}Sr_xMnO_3$ (such as $La_{0.75}Sr_{0.25}MnO_3$), doped lanthanum chromites (such as $La_{1-x}Ca_xCrO_{3-\delta}$, x=0.15-0.3), and/or $Pr_{1-x}Sr_xCoO_3$, such as $Pr_{0.8}Sr_{0.2}CoO_3$. In other embodiments, cathode conductive layer 30 may be formed of other materials, e.g., a precious metal cermet, although other materials may be employed without departing from the scope of the present invention. The precious metals in the precious metal cermet may include, for example, Pt, Pd, Au, Ag and/or alloys thereof. The ceramic phase may include, for example, YSZ, ScSZ and $Al_2O_3$, or other ceramic materials.

One example of cathode conductive layer materials is 80 wt % Pd-20 wt % LSM.

In the embodiment of FIG. 2, various features, components and interrelationships therebetween of aspects of an embodiment of the present invention are depicted. However, the present invention is not limited to the particular embodiment of FIG. 2 and the components, features and interrelationships therebetween as are illustrated in FIG. 2 and described herein.

In the present embodiment, anode conductive layer 22 is printed directly onto substrate 14, as is a portion of electrolyte sub-layer 26A. Anode layer 24 is printed onto anode conductive layer 22. Portions of electrolyte layer 26 are printed onto anode layer 24, and portions of electrolyte layer 26 are printed onto anode conductive layer 22 and onto substrate 14. Cathode layer 28 is printed on top of electrolyte layer 26. Portions of cathode conductive layer 30 are printed onto cathode layer 28 and onto electrolyte layer 26. Cathode layer 28 is spaced apart from anode layer 24 in a direction 32 by the local thickness of electrolyte layer 26.

Anode layer 24 includes anode gaps 34, which extend in a direction 36. Cathode layer 28 includes cathode gaps 38, which also extend in direction 36. In the present embodiment, direction 36 is substantially perpendicular to direction 32, although the present invention is not so limited. Gaps 34 separate anode layer 24 into a plurality of individual anodes 40, one for each electrochemical cell 12. Gaps 38 separate cathode layer 28 into a corresponding plurality of cathodes 42. Each anode 40 and the corresponding cathode 42 that is spaced apart in direction 32 therefrom, in conjunction with the portion of electrolyte layer 26 disposed therebetween, form an electrochemical cell 12.

Similarly, anode conductive layer 22 and cathode conductive layer 30 have respective gaps 44 and 46 separating anode conductive layer 22 and cathode conductive layer 30 into a plurality of respective anode conductor films 48 and cathode conductor films 50. The terms, "anode conductive layer" and "anode conductor film" may be used interchangeably, in as much as the latter is formed from one or more layers of the former; and the terms, "cathode conductive layer" and "cathode conductor film" may be used interchangeably, in as much as the latter is formed from one or more layers of the former.

In the present embodiment, anode conductive layer 22 has a thickness, i.e., as measured in direction 32, of approximately 5-15 microns, although other values may be employed without departing from the scope of the present invention. For example, it is considered that in other embodiments, the anode conductive layer may have a thickness in the range of 5-50 microns. In yet other embodiments, different thicknesses may be used, depending upon the particular material and application.

Similarly, anode layer 24 has a thickness, i.e., as measured in direction 32, of approximately 5-20 microns, although other values may be employed without departing from the scope of the present invention. For example, it is considered that in other embodiments, the anode layer may have a thickness in the range of 5-40 microns. In yet other embodiments, different thicknesses may be used, depending upon the particular anode material and application.

Electrolyte layer 26, including both electrolyte sub-layer 26A and electrolyte sub-layer 26B, of the present embodiment has a thickness of approximately 5-15 microns with individual sub-layer thicknesses of approximately 5 microns minimum, although other thickness values may be employed without departing from the scope of the present invention. For example, it is considered that in other embodiments, the electrolyte layer may have a thickness in the range of 5-40 microns. In yet other embodiments, different thicknesses may be used, depending upon the particular materials and application.

Cathode layer 28 has a thickness, i.e., as measured in direction 32, of approximately 10-20 microns, although other values may be employed without departing from the scope of the present invention. For example, it is considered that in other embodiments, the cathode layer may have a thickness in the range of 10-50 microns. In yet other embodiments, different thicknesses may be used, depending upon the particular cathode material and application.

Cathode conductive layer 30 has a thickness, i.e., as measured in direction 32, of approximately 5-100 microns, although other values may be employed without departing from the scope of the present invention. For example, it is considered that in other embodiments, the cathode conductive layer may have a thickness less than or greater than the range of 5-100 microns. In yet other embodiments, different thicknesses may be used, depending upon the particular cathode conductive layer material and application.

In each electrochemical cell 12, anode conductive layer 22 conducts free electrons away from anode 24 and conducts the electrons to cathode conductive layer 30 via interconnect 16. Cathode conductive layer 30 conducts the electrons to cathode 28.

Interconnect 16 is embedded in electrolyte layer 26, and is electrically coupled to anode conductive layer 22, and extends in direction 32 from anode conductive layer 22 through electrolyte sub-layer 26A toward electrolyte sub-layer 26B, then in direction 36 from one electrochemical cell 12 to the next adjacent electrochemical cell 12, and then in direction 32 again toward cathode conductive layer 30, to which interconnect 16 is electrically coupled. In particular, at least a portion of interconnect 16 is embedded within an extended portion of electrolyte layer 26, wherein the extended portion of electrolyte layer 26 is a portion of electrolyte layer 26 that extends beyond anode 40 and cathode 42, e.g., in direction 32, and is not sandwiched between anode 40 and cathode 42.

Figure 3:
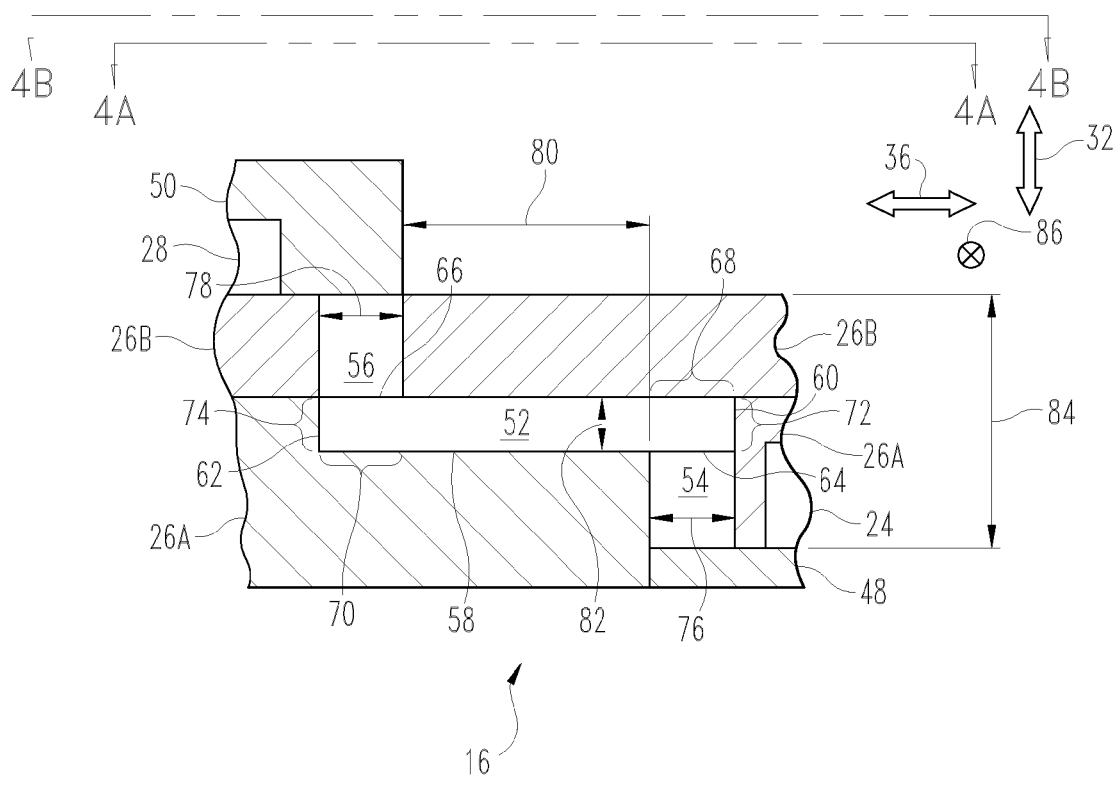
FIG. 3 is an enlarged cross sectional view of a portion of the interconnect of FIG. 2.

Referring to FIG. 3, some aspects of a non-limiting example of interconnect 16 are described in greater detail. Interconnect 16 includes a blind primary conductor 52, and two blind auxiliary conductors, or vias 54, 56. Blind primary conductor 52 is sandwiched between electrolyte sub-layer 26A and electrolyte sub-layer 26B, and is formed of a body 58 extending between a blind end 60 and a blind end 62 opposite end 60. Blind-primary conductor 52 defines a conduction path encased within electrolyte layer 26 and oriented along direction 36, i.e., to conduct a flow of electrons in a direction substantially parallel to direction 36. Blind auxiliary conductor 54 has a blind end 64, and blind auxiliary conductor 56 has a blind end 66. Blind auxiliary conductors 54 and 56 are oriented in direction 32. As that term is used herein, "blind" relates to the conductor not extending straight through electrolyte layer 26 in the direction of orientation of the conductor, i.e., in the manner of a "blind hole" that ends in a structure, as opposed to a "through hole" that passes through the structure. Rather, the blind ends face portions of electrolyte layer 26. For example, end 64 of conductor 54 faces portion 68 electrolyte sub-layer 26B and is not able to "see" through electrolyte sub-layer 26B. Similarly, end 66 of conductor 56 faces portion 70 of electrolyte sub-layer 26A and is not able to "see" through electrolyte sub-layer 26A. Likewise, ends 60 and 62 of body 58 face portions 72 and 74, respectively, and are not able to "see" through electrolyte sub-layer 26A.

In the embodiment of FIG. 3, various features, components and interrelationships therebetween of aspects of an embodiment of the present invention are depicted. However, the present invention is not limited to the particular embodiment of FIG. 3 and the components, features and interrelationships therebetween as are illustrated in FIG. 3 and described herein.

It will be understood that FIG. 3 is not to scale; for example, vertical dimensions are exaggerated for purposes of clarity of illustration.

In the present embodiment, blind primary conductor 52 is a conductive film created with a screen printing process, which is embedded within electrolyte layer 26, sandwiched between electrolyte sub-layers 26A and 26B. Anode layer 24 is oriented along a first plane, cathode layer 28 is oriented along a second plane substantially parallel to the first plane, electrolyte layer 26 is oriented along a third plane substantially parallel to the first plane, and the conductive film forming blind primary conductor 52 extends in a direction substantially parallel to the first plane.

In one form, the material of blind primary conductor 52 may be a precious metal cermet or an electrically conductive ceramic. In other embodiments, other materials may be employed in addition to or in place of a precious metal cermet or an electrically conductive ceramic, e.g., a precious metal, such as Ag, Pd, Au and/or Pt, although other materials may be employed without departing from the scope of the present invention. In various embodiments, it is contemplated that one or more of many materials may be employed, including precious metal alloys, such as Ag—Pd, Ag—Au, Ag—Pt, Au—Pd, Au—Pt, Pt—Pd, Ag—Au—Pd, Ag—Au—Pt, and Ag—Au—Pd—Pt, cermets composed of precious metal or alloys, Ni metal and/or Ni alloy, and an inert ceramic phase, such as alumina, or ceramic phase with minimum ionic conductivity which will not generate significant parasitic current, such as YSZ, ScSZ, and/or conductive ceramics, such as at least one of LNF ($LaNi_xFe_{1-x}O_3$), LSM ($La_{1-x}Sr_xMnO_3$), doped strontium titanate, doped yttrium chromites, LSCM ($La_{1-x}Sr_xCr_{1-y}Mn_yO_3$), and/or other doped lanthanum chromites, and conductive ceramics, such as LNF ($LaNi_xFe_{1-x}O_{3-}$), for example, $LaNi_{0.6}Fe_{0.4}O_3$, LSM ($La_{1-x}Sr_xMnO_3$), such as $La_{0.75}Sr_{0.25}MnO_3$, doped strontium titanate, doped yttrium chromites, LSCM ($La_{1-x}Sr_xCr_{1-y}Mn_yO_3$), such as $La_{0.75}Sr_{0.25}Cr_{0.5}Mn_{0.5}O_3$, and other doped lanthanum chromites. In other embodiments, it is contemplated that blind primary conductor 52 may be formed of a Ni metal cermet and/or a Ni alloy cermet in addition to or in place of the materials mentioned above. The Ni metal cermet and/or the Ni alloy cermet may have one or more ceramic phases, for example and without limitation, a ceramic phase being YSZ, alumina, ScSZ, doped ceria and/or $TiO_2$. In various embodiments, blind primary conductor 52 may be formed of materials set forth above with respect to interconnect 16.

One example of materials for blind primary conductor 52 is $y(Pd_xPt_{1-x})$-(1-y)YSZ. Where x is from 0 to 1 in weight ratio. For cost reduction, x is preferred in the range of 0.5 to 1. For better performance and higher system efficiency, x is preferred in the range of 0 to 0.5. Because hydrogen has higher flux in Pd. Y is from 0.35 to 0.80 in volume ratio, preferably y is in the range of 0.4 to 0.6.

Another example of materials for blind primary conductor 52 is x % Pd-y % Ni-(100-x-y) % YSZ, where x=70-80, y=5-10.

Each of blind auxiliary conductors 54 and 56 may be formed from the same or different materials than primary conductor 52. In one form, blind auxiliary conductor 54 is formed during processing of blind primary conductor 52 and from the same material as blind primary conductor 52, whereas blind auxiliary conductor 56 is formed at the same process step as cathode conductive layer 30 and from the same material as cathode conductive layer 30. However, in other embodiments, blind primary conductor 52, blind auxiliary conductor 54 and blind auxiliary conductor 56 may be made from other material combinations without departing from the scope of the present invention.

The materials used for blind auxiliary conductor 54 and blind auxiliary conductor 56 may vary with the particular application. For example, with some material combinations, material migration may occur at the interface of interconnect 16 with anode conductive layer 22 and/or cathode conductive layer 30 during either cell fabrication or cell testing, which may cause increased resistance at the interface and higher cell degradation during fuel cell operation. Material may migrate into primary conductor 52 from anode conductive layer 22 and/or cathode conductive layer 30, and/or material may migrate from primary conductor 52 into anode conductive layer 22 and/or cathode conductive layer 30, depending upon the compositions of primary conductor 52, anode conductive layer 22 and cathode conductive layer 30. To reduce material migration at the interconnect/conductive layer interface, one or both of blind auxiliary conductor 54 and blind auxiliary conductor 56 may be formed from a material that yields an electrically conductive chemical barrier layer between primary conductor 52 and a respective one or both of anode conductive layer 22 (anode conductor film 48) and/or cathode conductive layer 30 (cathode conductor film 50). This chemical barrier may eliminate or reduce material migration during fuel cell fabrication and operation.

Materials for auxiliary conductor 54 at the interconnect 16 and anode conductive layer 22 interface that may be used to form a chemical barrier may include, but are not limited to Ni cermet, Ni-precious metal cermet and the precious metal can be Ag, Au, Pd, Pt, or the alloy of them, the ceramic phase in the cermet can be at least one of YSZ (yttria doping is 3-5 mol % in zironia), ScSZ (scandia doping is 4-6 mol % in zirconia), doped ceria (such as GDC, or SDC), alumina, and $TiO_2$, or conductive ceramics, such as doped strontium titanate, doped yttrium chromites, $La_{1-x}Sr_xCr_{1-y}Mn_yO_3$ (x=0.15-0.35, y=0.25-0.5), and other doped lanthanum chromites.

One example of auxiliary conductor 54 is 50 v %(50Pd50Pt)-50 v % 3YSZ.

Another example of auxiliary conductor 54 is 15% Pd, 19% NiO, 66% NTZ, where NTZ is 73.6 wt % NiO, 20.0% $TiO_2$, 6.4% 3YSZ.

Materials for auxiliary conductor 56 at the interconnect 16 and cathode conductive layer 30 interface that may be used to form a chemical barrier may include, but are not limited to precious metal cermets having a precious metal being at least one of: Ag, Au, Pd, Pt, or its alloy, wherein the ceramic phase may be at least one of YSZ (yttria doping is preferred from 3-5 mol %), ScSZ (scandia doping is preferred from 4-6 mol %), LNF ($LaNi_xFe_{1-x}O_3$, x=0.6), LSM ($La_{1-x}Sr_xMnO_3$, x=0.1 to 0.3), doped yttrium chromites (such as $Y_{0.8}Ca_{0.2}CrO_3$), LSCM ($La_{1-x}Sr_xCr_{1-y}Mn_yO_3$), x=0.15-0.35, y=0.5-0.75), and other doped lanthanum chromites (such as $La_{0.7}Ca_{0.3}CrO_3$), or conductive ceramics, such as at least one of LNF ($LaNi_xFe_{1-x}O_3$), LSM ($La_{1-x}Sr_xMnO_3$), Ruddlesden-Popper nickelates, LSF (such as $La_{0.8}Sr_{0.2}FeO_3$), LSCF ($La_{0.6}Sr_{0.4}Co_{0.2}Fe_{0.8}O_3$), LSCM ($La_{1-x}Sr_xCr_{1-y}Mn_yO_3$), LCM (such as $La_{0.8}Ca_{0.2}MnO_3$), doped yttrium chromites and other doped lanthanum chromites.

One example for auxiliary conductor 56 is 50 v % (50Pd50Pt)-50 v % 3YSZ.

Another example of auxiliary conductor 56 is 15% Pd, 19% NiO, 66% NTZ, where NTZ is 73.6 wt % NiO, 20.0% $TiO_2$, 6.4% 3YSZ.

In the present embodiment, auxiliary conductor 54 has a width 76, i.e., in direction 36, of approximately 0.4 mm, although greater or lesser widths may be used without departing from the scope of the present invention. Similarly, auxiliary conductor 56 has a width 78, i.e., in direction 36, of approximately 0.4 mm, although greater or lesser widths may be used without departing from the scope of the present invention. Primary conductor 52 has a length in direction 36 that defines a minimum diffusion distance 80 for any hydrogen that may diffuse through interconnect 16, e.g., due to sintering porosity, microcracks, voids and/or other defects introduced into interconnect 16 during processing. In the present embodiment, diffusion distance 80 is 0.6 mm, although greater or lesser widths may be used without departing from the scope of the present invention. The film thickness 82 of primary conductor 52, i.e., as measured in direction 32, is approximately 5-15 microns. The total height 84 of interconnect 16 in direction 32 is approximately 10-25 microns, which generally corresponds to the thickness of electrolyte layer 26.

The total diffusion distance for hydrogen diffusing through interconnect 16 may include the height of auxiliary conductor 54 and auxiliary conductor 56 in direction 32, which may be given by subtracting from the total height 84 the film thickness 82 of primary conductor 52, which yields approximately 10 microns. Thus, the diffusion distance is predominantly controlled by diffusion distance 80, e.g., since the heights of auxiliary conductors 54 and 56 represent only a small fraction of the total diffusion distance.

Figure 4A:
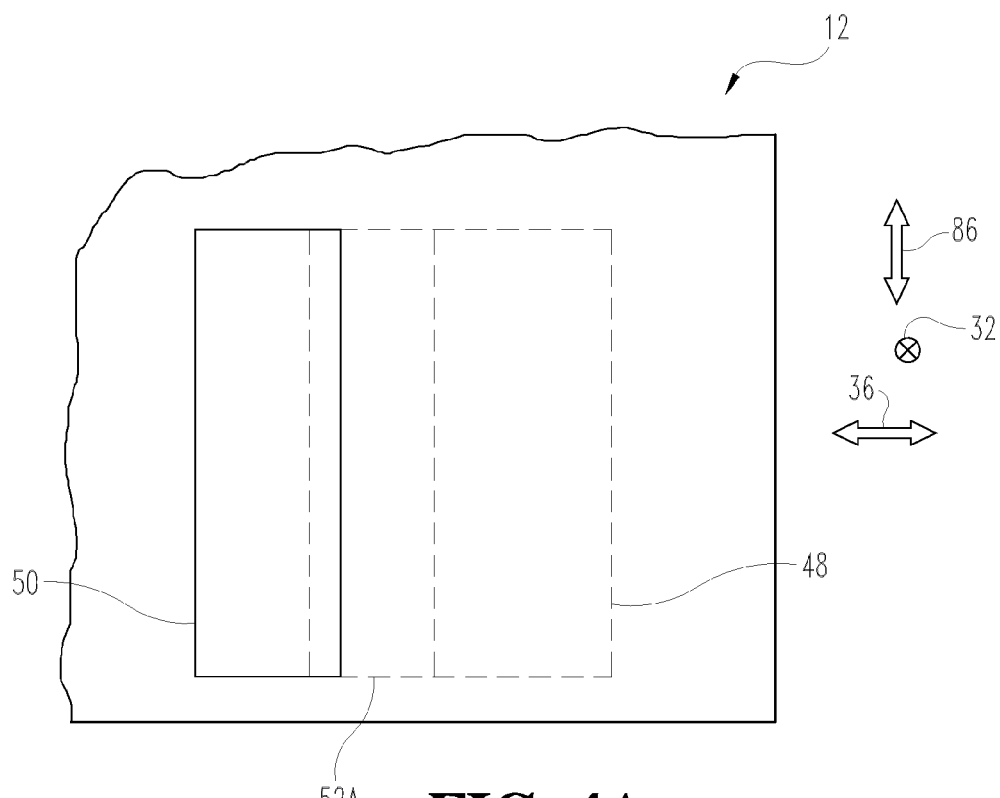
FIGS. 4A and 4B depict some alternate embodiments of interconnect configurations.
Figure 4B:
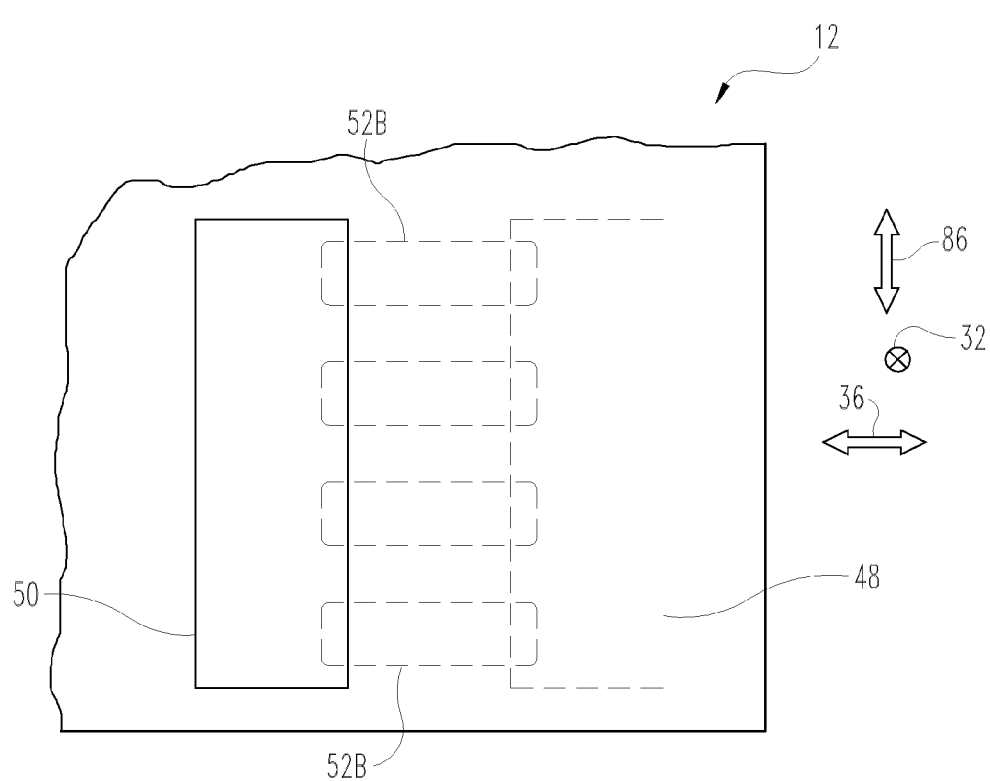

Referring to FIGS. 4A and 4B, a plan view of a continuous "strip" configuration of interconnect 16 and a plan view of a "via" configuration of interconnect 16 are respectively depicted. The term, "strip," pertains to the configuration being in the form of a single long conductor that is comparatively narrow in width as compared to length. In the strip configuration, the primary conductor takes the form of a continuous strip 52A extending in a direction 86 that in the present embodiment is substantially perpendicular to both directions 32 and 36, and runs approximately the length in direction 86 of electrochemical cell 12. In the depiction of FIGS. 4A and 4B, direction 32 extends into and out of the plane of the drawing, and hence is represented by an "X" within a circle. The term, "via," pertains to a relatively small conductive pathway through a material that connects electrical components. In the depiction of FIG. 4B, the primary conductor takes the form of a plurality of vias 52B, e.g., each having a width in direction 86 of only approximately 0.4 mm, although greater or lesser widths may be used without departing from the scope of the present invention.

In the embodiment of FIGS. 4A and 4B, various features, components and interrelationships therebetween of aspects of an embodiment of the present invention are depicted. However, the present invention is not limited to the particular embodiment of FIGS. 4A and 4B and the components, features and interrelationships therebetween as are illustrated in FIGS. 4A and 4B and described herein.

Referring again to FIG. 3, in conjunction with FIGS. 4A and 4B, the minimum diffusion area of interconnect 16 is controlled by the diffusion area of primary conductor 52, which serves as a diffusion flow orifice that restricts the diffusion of fluid. For example, if, for any reason, primary conductor 52 is not non-porous, fluid, e.g., oxidant and fuel in liquid and/or gaseous form may diffuse through interconnect 16. Such diffusion is controlled, in part, by the film thickness 82. In the "strip" configuration, the diffusion area is given by the width of continuous strip 52A in direction 86 times the film thickness 82, whereas in the "via" configuration, the diffusion area is given by the width of each via 52B in direction 86 times the film thickness 82 times the number of vias 52B.

Although it may be possible to employ an interconnect that extends only in direction 32 from anode conductor film 48 to cathode conductor film 50 (assuming that cathode conductor film 50 were positioned above anode conductor films 48 in direction 36), such a scheme would result in higher leakage than were the interconnect of the present invention employed.

Figure 5:
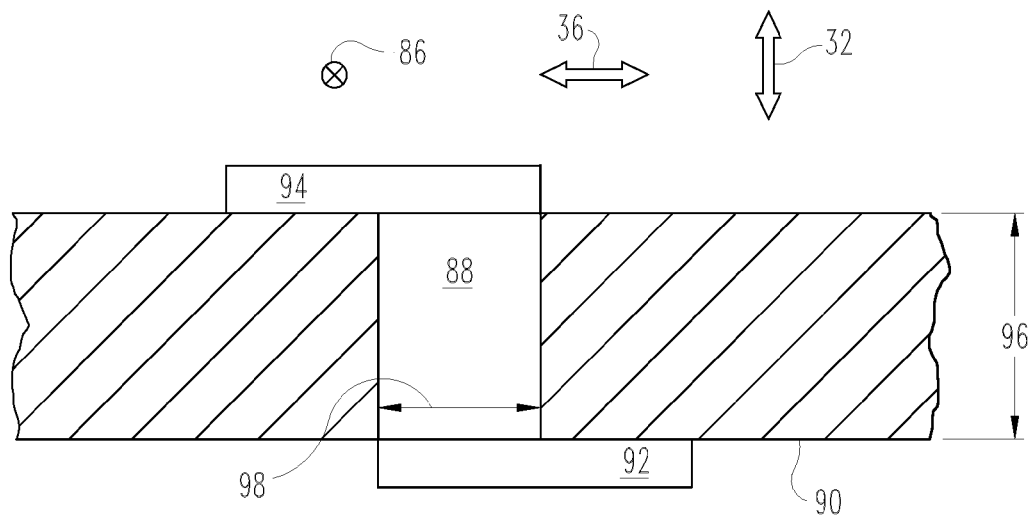
FIG. 5 depicts a hypothetical interconnect that is contrasted herein with embodiments of the present invention.

For example, referring to FIG. 5, some aspects of a non-limiting example of an interconnect 88 are depicted, wherein interconnect 88 in the form of a via passing through an electrolyte layer 90, which is clearly not embedded in electrolyte layer 90 or sandwiched between sub-layers of electrolyte layer 90, and does not include any blind conductors. Interconnect 88 transfers electrical power from an anode conductor 92 to a cathode conductor 94. For purposes of comparison, the length 96 of interconnect 88 in direction 32, which corresponds to the thickness of electrolyte layer 90, is assumed to be the 10-15 microns, e.g., similar to interconnect 16, and the width of interconnect 88, e.g., the width of the open slot in the electrolyte 96 into which interconnect 88 is printed, in direction 36 is assumed to be the minimum printable via dimension 98 in direction 36 with current industry technology, which is approximately 0.25 mm. The length of interconnect 88 in direction 86 is assumed to be 0.4 mm. Thus, with interconnect 88, the diffusion flow area for one via is approximately 0.25 mm times 0.4 mm, which equals 0.1 mm². The limiting dimension is the minimum 0.25 mm screen printed via dimension 98.

With the present invention, however, assuming via 52B (FIG. 4B) to have the same length in direction 86 of 0.4 mm, the diffusion flow area for one via of 0.4 mm times the film thickness in direction 32 of 0.010 mm (10 microns) equals 0.004 mm², which is only 4 percent of the flow area of interconnect 88. Thus, by employing a geometry that allows a reduction of the minimum dimension that limits a minimum diffusion flow area, the diffusion flow area of the interconnect may be reduced, thereby potentially decreasing diffusion of oxidant and/or fuel through the interconnector, e.g., in the event the interconnect is not fully non-porous (such as, for example, due to process limitations and/or manufacturing defects), or the interconnect is a mixed ion and electronic conductor.

Further, the diffusion distance in interconnect 88 corresponds to the thickness 96 of interconnect 88, which in the depicted example is also the thickness of electrolyte layer 90, i.e., 10-15 microns.

In contrast, the diffusion distance of the inventive blind primary connector 52, whether in the form of a continuous strip 52A or a via 52B, is diffusion distance 80, which is 0.6 mm, and which is 40-60 times the diffusion distance of interconnect 88 (0.6 mm divided by 10-15 microns), which is many times the thickness of the electrolyte. Thus, by employing a geometry wherein the diffusion distance extends in a direction not limited by the thickness of the electrolyte, the diffusion distance of the interconnect may be substantially increased, thereby potentially decreasing diffusion of oxidant and/or fuel through the interconnector.

Generally, the flow of fuel and/or air through an interconnect made from a given material and microstructure depends on the flow area and flow distance. Some embodiments of the present invention may reduce fuel and/or air flow through the interconnect by $10^2$ to $10^4$ magnitude, e.g., if the connector is not non-porous, depending on the specific dimension of the interconnect used.

For example, processing-related defects such as sintering porosity, microcracks and voids are typically from sub-microns to a few microns in size (voids) or a few microns to 10 microns (microcracks). With a diffusion distance of only 10-15 microns, the presence of a defect may provide a direct flowpath through the interconnect, or at least decrease the diffusion distance by a substantial percentage. For example, assume a design diffusion distance of 10 microns. In the presence of a 10 micron defect, a direct flowpath for the flow of hydrogen and/or oxidant would occur, since such a defect would open a direct pathway through the interconnect (it is noted that the anode/conductive layer and cathode/conductive layer are intentionally porous). Even assuming a design diffusion distance of 15 microns in the presence of a 10 micron defect, the diffusion distance would be reduced by 67%, leaving a net diffusion distance of only 5 microns.

On the other hand, a 10 micron defect in the inventive interconnect 16 would have only negligible effect on the 0.6 mm design diffusion distance of primary conductor 52, i.e., reducing the 0.6 mm design diffusion distance to 0.59 mm, which is a relatively inconsequential reduction caused by the presence of the defect.

Figure 6A:
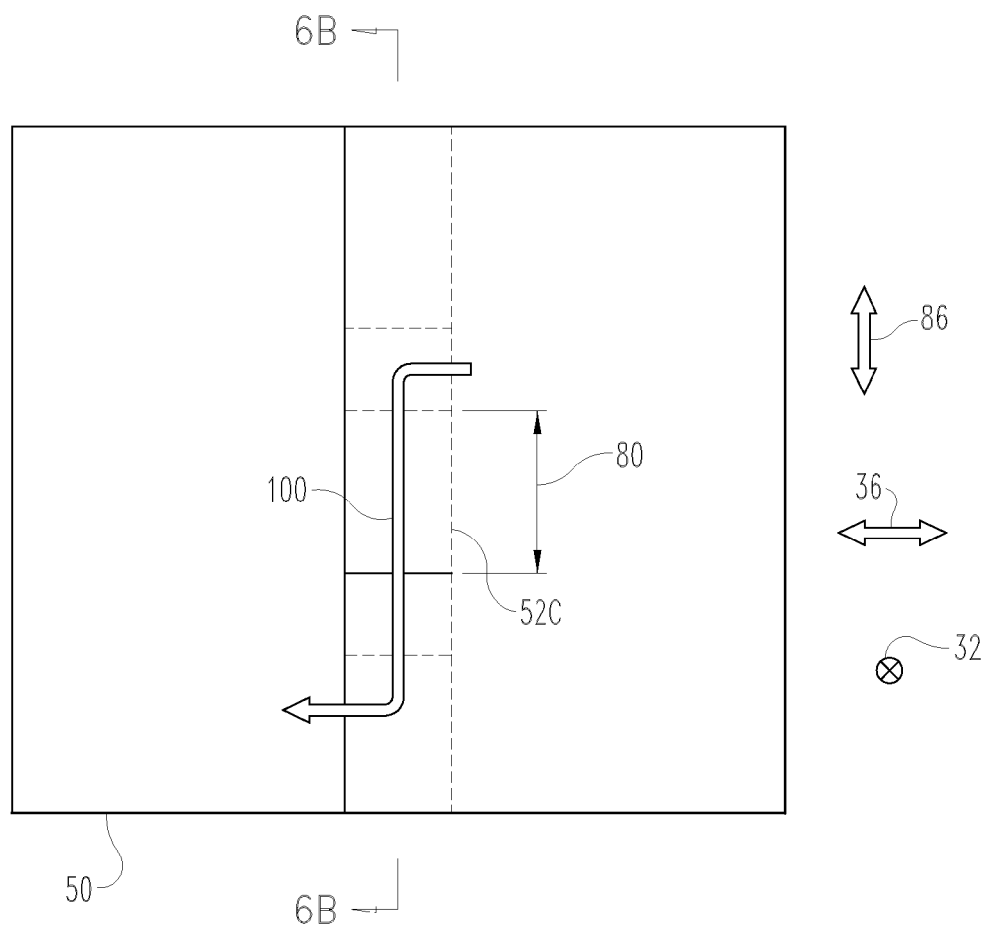
FIGS. 6A and 6B show a top view and a side view, respectively, of some aspects of a non-limiting example of yet another embodiment of an interconnect.
Figure 6B:
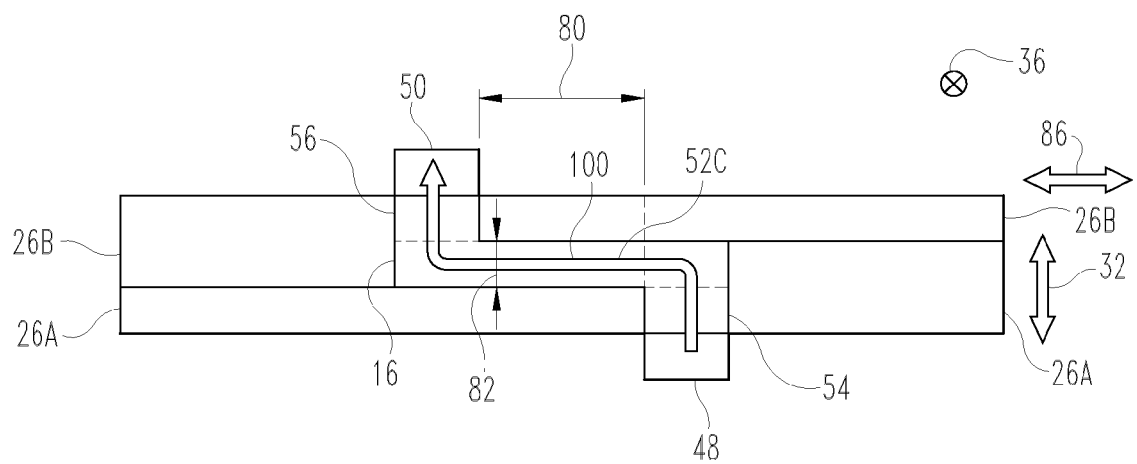

Referring to FIGS. 6A and 6B, some aspects of a non-limiting example of an embodiment of the present invention having a blind primary conductor in the form of a via 52C extending in direction 86 are depicted. In the depiction of FIG. 6A, direction 32 extends into and out of the plane of the drawing, and hence is represented by an "X" within a circle. In the depiction of FIG. 6B, direction 36 extends into and out of the plane of the drawing, and hence is represented by an "X" within a circle. Via 52C is similar to via 52B, except that it extends in direction 86 rather than direction 36, for example, as indicated by diffusion distance 80 being oriented in direction 86. It will be understood that although FIGS. 6A and 6B depict only a single via 52C, embodiments of the present invention may include a plurality of such vias extending along direction 86.

The direction of electron flow in FIGS. 6A and 6B is illustrated by three dimensional flowpath line 100. Electrons flow in direction 36 through anode conductor film 48 toward auxiliary conductor 54, and then flow in direction 32 through auxiliary conductor 54 toward via 52C. The electrons then flow in direction 86 through via 52C toward auxiliary conductor 56, and then flow in direction 32 through auxiliary conductor 56 into cathode conductor film 50, after which the electrons flow in direction 36 through cathode conductor film 50, e.g., to the next electrochemical cell.

In the embodiment of FIGS. 6A and 6B, various features, components and interrelationships therebetween of aspects of an embodiment of the present invention are depicted. However, the present invention is not limited to the particular embodiment of FIGS. 6A and 6B and the components, features and interrelationships therebetween as are illustrated in FIGS. 6A and 6B and described herein.

Figure 7:
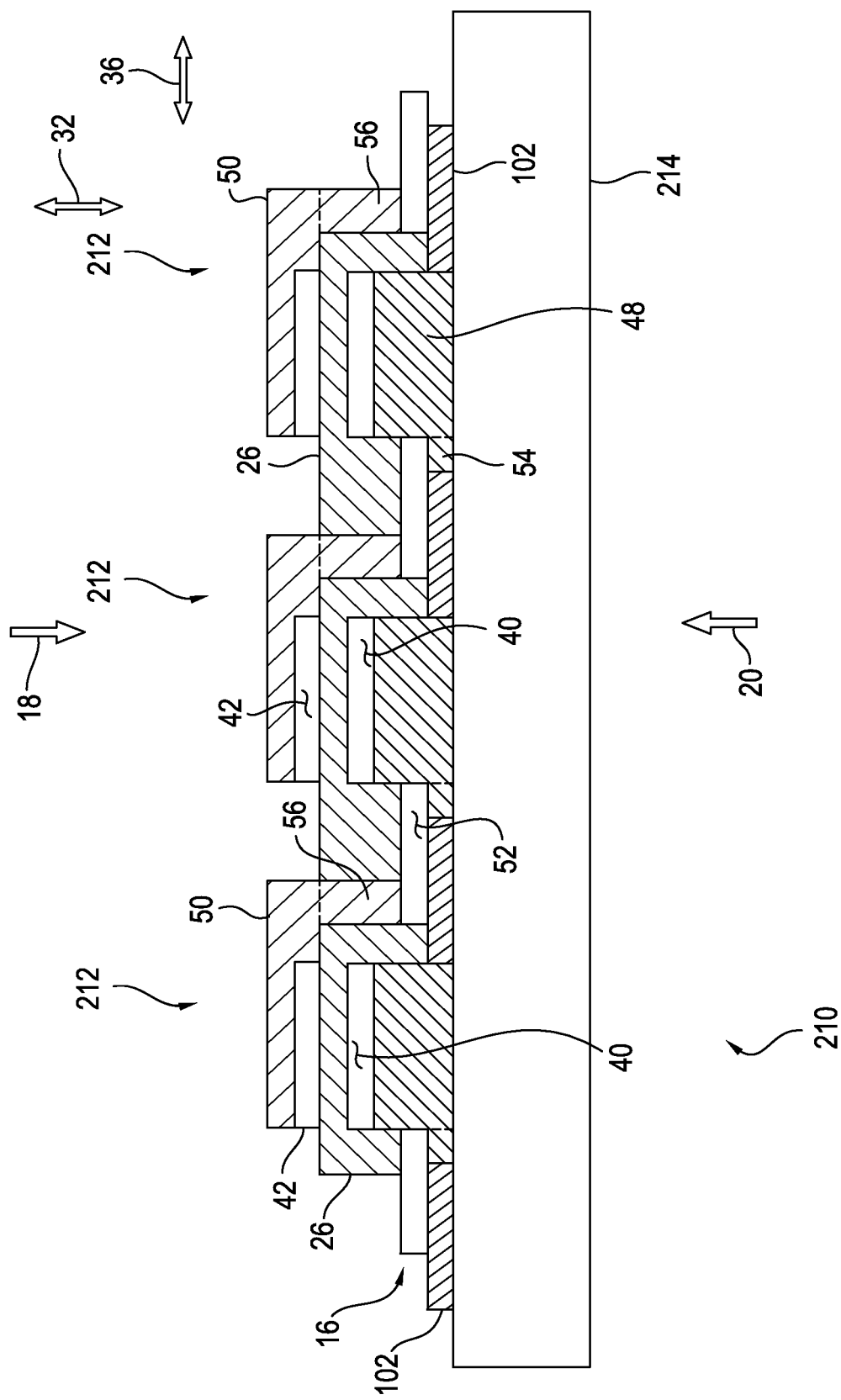
FIG. 7 schematically depicts some aspects of a non-limiting example of a cross section of a fuel cell system having a ceramic seal in accordance with an embodiment of the present invention.

Referring to FIG. 7, some aspects of a non-limiting example of an embodiment of a fuel cell system 210 are schematically depicted. Fuel cell system 210 includes a plurality of electrochemical cells 212 disposed on a substrate 214, each electrochemical cell 212 having a seal in the form of a ceramic seal 102. Fuel cell system 210 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 214. In the embodiment of FIG. 7, auxiliary conductor 56 of interconnect 16 is formed of the same material as cathode conductor film 50, whereas auxiliary conductor 54 of interconnect 16 is formed of the same material as anode conductor film 48. Blind primary conductor 52 of interconnect 16 is formed of the same material described above with respect to interconnect 16 in the embodiment of FIG. 2. In other embodiments, for example, auxiliary conductor 54 and/or auxiliary conductor 56 may be formed of the same material as blind primary conductor 52, or may be formed of different materials. In one form, blind primary conductor 52 is in the form of a continuous strip, e.g., continuous strip 52A depicted in FIG. 4A. In another form, blind primary conductor 52 is in the form of a plurality of vias, such as vias 52B in FIG. 4B. In other embodiments, blind primary conductor 52 may take other forms not explicitly set forth herein.

In one form, ceramic seal 102 is applied onto porous substrate 214, and is positioned horizontally (in the perspective of FIG. 7) between the anode conductor film 48 of one electrochemical cell 212 and the auxiliary conductor 54 of the adjacent electrochemical cell 212. In other embodiments, ceramic seal 102 may be located in other orientations and locations. Ceramic seal 102 has a thickness, i.e., as measured in direction 32, of approximately 5-30 microns, although other thickness values may be employed in other embodiments. In one form, ceramic seal 102 is impervious to gases and liquids, such as the fuel and oxidants employed by electrochemical cells 212, and is configured to prevent the leakage of gases and liquids from substrate 214 in those areas where it is applied. In other embodiments, ceramic seal 102 may be substantially impervious to gases and liquids, and may be configured to reduce leakage of gases and liquids from substrate 214 in those areas where it is applied, e.g., relative to other configurations that do not employ a ceramic seal. Ceramic seal 102 is configured to provide an essentially "gas-tight" seal between substrate 214 and fuel cell components disposed on the side of ceramic seal 102 opposite of that of substrate 214.

In one form, ceramic seal 102 is positioned to prevent or reduce leakage of gases and liquids from substrate 214 into interconnect 16. In one form, ceramic seal 102 extends in direction 36, and is positioned vertically (in direction 32) between porous substrate 214 on the bottom and blind primary conductor 52 of interconnect 16 and electrolyte 26 on the top, thereby preventing the leakages of gases and liquids into the portions of blind primary conductor 52 (and electrolyte 26) that are overlapped by ceramic seal 102. In other embodiments, ceramic seal 102 may be disposed in other suitable locations in addition to or in place of that illustrated in FIG. 7. Blind primary conductor 52 is embedded between a portion of ceramic seal 102 on the bottom and a portion of extended electrolyte 26 on the top. The diffusion distance in the embodiment of FIG. 7 is primarily defined by the length of the overlap of interconnect 16 by both ceramic seal 102 and electrolyte 26 in direction 36. In one form, the overlap is 0.3-0.6 mm, although in other embodiments, other values may be employed. Interconnect 16 extends into the active electrochemical cell 212 area. In some embodiments, the primary interconnect area of the configuration illustrated in FIG. 7 may be smaller than other designs, which may increase the total active cell area on substrate 214, which may increase the efficiency of fuel cell system 210.

Ceramic seal 102 is formed from a ceramic material. In one form, the ceramic material used to form ceramic seal 102 is yittria stabilized zirconia, such as 3YSZ. In another form, the material used to form ceramic seal 102 is scandia stabilized zirconia, such as 4ScSZ. In another form, the material used to form ceramic seal 102 is alumina. In another form, the material used to form ceramic seal 102 is non-conductive Pyrochlore materials, such as $La_2Zr_2O_7$. Other embodiments may employ other ceramics, e.g., depending upon various factors, such as compatibility with the materials of adjacent portions of each electrochemical cell 212 and substrate 214, the fuels and oxidants employed by fuel cell system 210, and the local transient and steady-state operating temperatures of fuel cell system 210. Still other embodiments may employ materials other than ceramics.

In the embodiment of FIG. 7, various features, components and interrelationships therebetween of aspects of an embodiment of the present invention are depicted. However, the present invention is not limited to the particular embodiment of FIG. 7 and the components, features and interrelationships therebetween as are illustrated in FIG. 7 and described herein.

Figure 8:
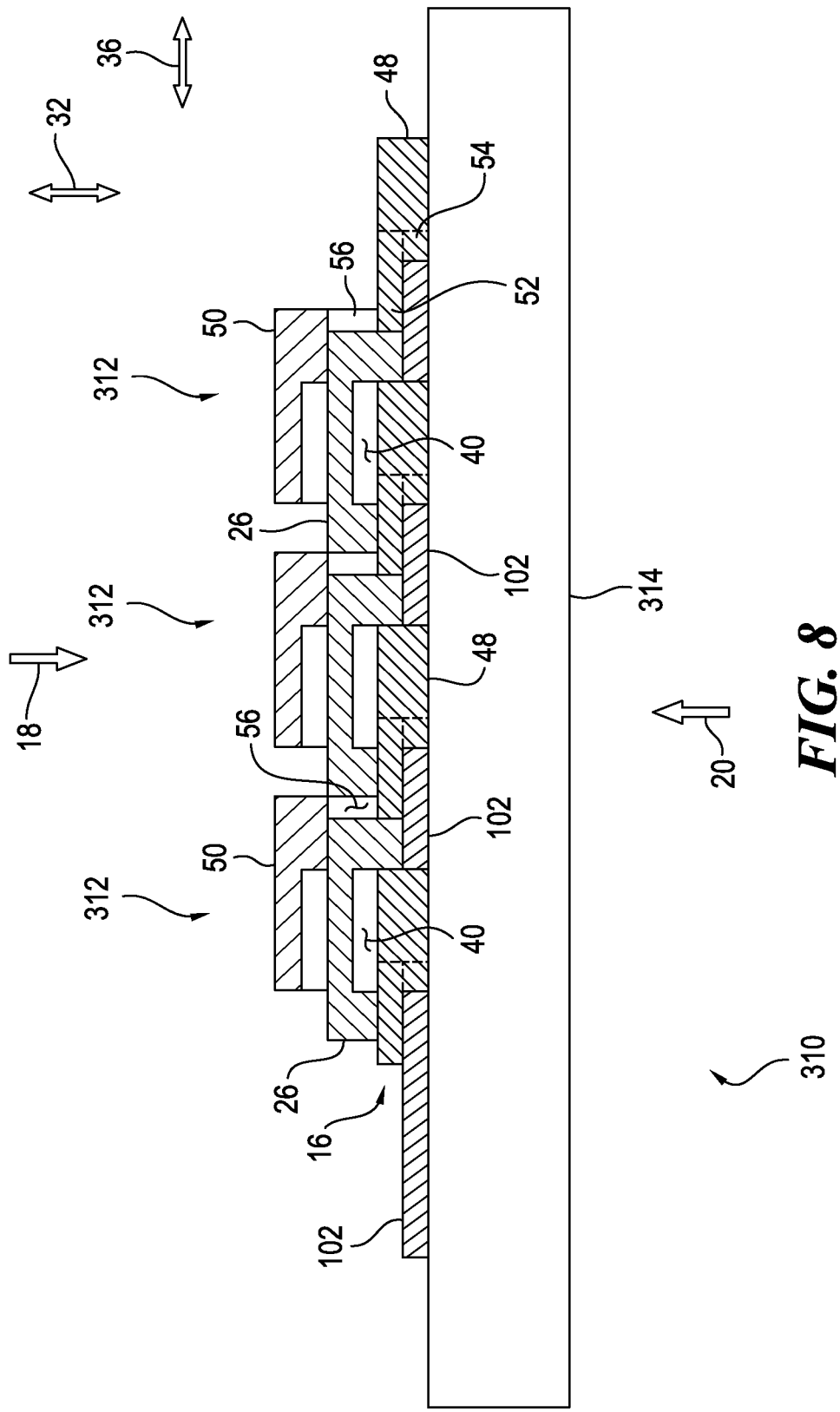
FIG. 8 schematically depicts some aspects of a non-limiting example of a cross section of another embodiment of a fuel cell system having a ceramic seal.

Referring to FIG. 8, some aspects of a non-limiting example of an embodiment of a fuel cell system 310 are schematically depicted. Fuel cell system 310 includes a plurality of electrochemical cells 312 disposed on a substrate 314, each electrochemical cell 312 including a ceramic seal 102. Fuel cell system 310 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 314. In the embodiment of FIG. 8, interconnect 16 is formed predominantly by the material of anode conductor film 48, and hence, blind primary conductor 52 and auxiliary conductor 54 in the embodiment of FIG. 8 may be considered as extensions of anode conductor film 48. For example, blind primary conductor 52 and auxiliary conductor 54 are depicted as being formed by the material of anode conductor film 48, whereas auxiliary conductor 56 is formed of the materials set forth above for interconnect 16 in the embodiment of FIG. 2. In one form, blind primary conductor 52 is in the form of a continuous strip, e.g., continuous strip 52A depicted in FIG. 4A. In another form, blind primary conductor 52 is in the form of a plurality of vias, such as vias 52B in FIG. 4B. In other embodiments, blind primary conductor 52 may take other forms not explicitly set forth herein.

Ceramic seal 102 is positioned to prevent or reduce leakage of gases and liquids from substrate 314 into interconnect 16. In one form, ceramic seal 102 is positioned vertically (in direction 32) between porous substrate 314 on the bottom and blind primary conductor 52 and electrolyte 26 on the top, thereby preventing the leakages of gases and liquids into the portions of blind primary conductor 52 that are overlapped by ceramic seal 102. Blind primary conductor 52 is embedded between a portion of ceramic seal 102 on the bottom and extended electrolyte 26 on the top. The diffusion distance in the embodiment of FIG. 8 is primarily defined by the length of the overlap of interconnect 16 by both ceramic seal 102 and electrolyte 26 in direction 36. In one form, the overlap is 0.3-0.6 mm, although in other embodiments, other values may be employed.

Figure 9:
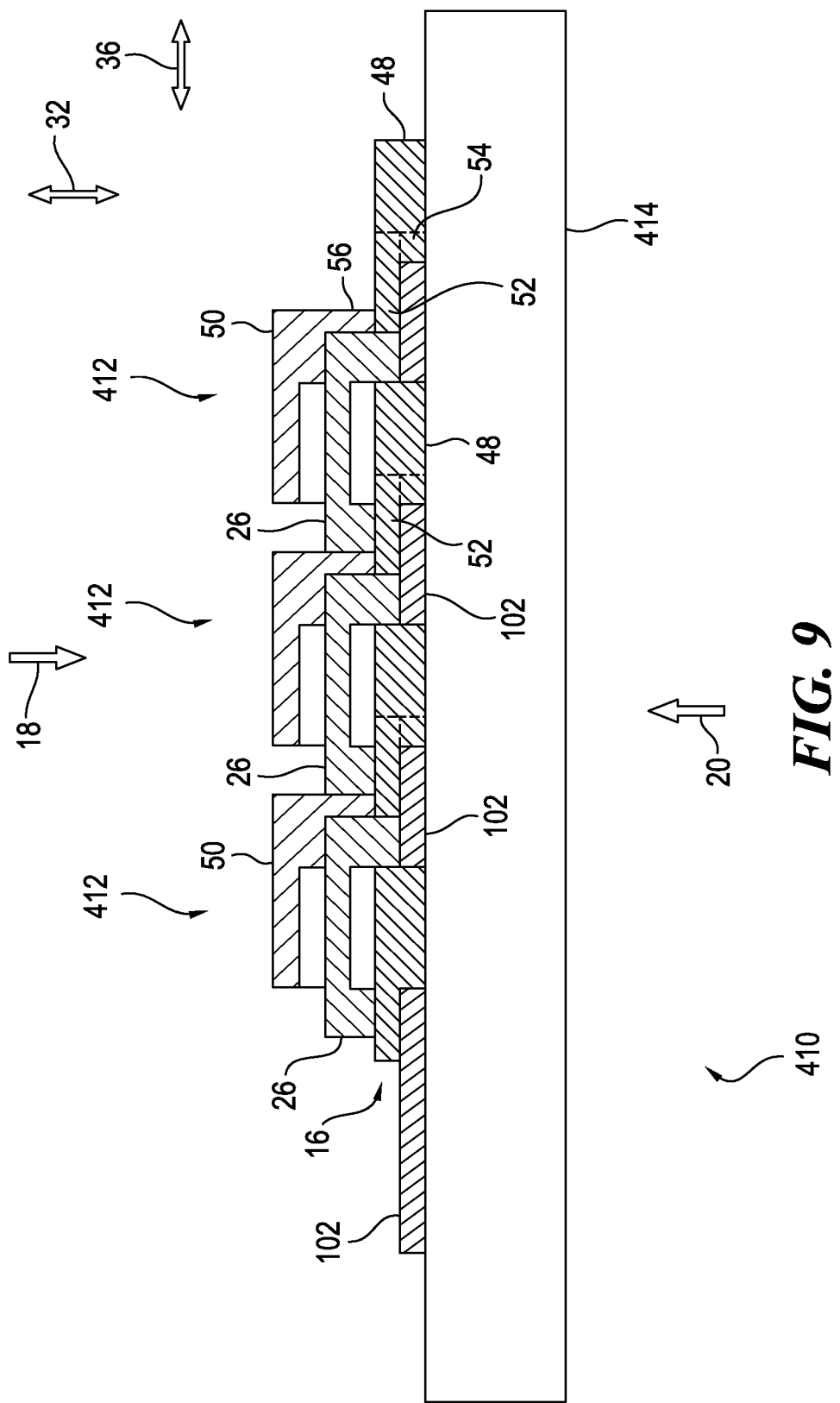
FIG. 9 schematically depicts some aspects of a non-limiting example of a cross section of yet another embodiment of a fuel cell system having a ceramic seal.

Because ceramic seal 102 prevents the ingress of gas and liquids into electrochemical cell 312, interconnect 16 does not need to be as dense (in order to prevent or reduce leakage) as other designs that do not include a seal, such as ceramic seal 102. In such designs, interconnect 16 may be formed of the materials used to form anode conductor layer 48 and/or cathode conductor layer 50. For example, referring to FIG. 9, an embodiment is depicted wherein interconnect 16 is formed entirely of the materials used to form anode conductor layer 48 and cathode conductor layer 50. FIG. 9 schematically depicts some aspects of a non-limiting example of an embodiment of a fuel cell system 410. Fuel cell system 410 includes a plurality of electrochemical cells 412 disposed on a substrate 414, each electrochemical cell 412 including a ceramic seal 102. Fuel cell system 410 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 414. In the embodiment of FIG. 9, blind primary conductor 52 and auxiliary conductor 54 are formed of the same material used to form anode conductor film 48, and are formed in the same process steps used to form anode conductor film 48. Hence, blind primary conductor 52 and auxiliary conductor 54 in the embodiment of FIG. 9 may be considered as extensions of anode conductor film 48. Similarly, in the embodiment of FIG. 9, auxiliary conductor 56 is formed of the same material used to form cathode conductor film 50, and is formed in the same process steps used to form cathode conductor film 50. Hence, auxiliary conductor 56 in the embodiment of FIG. 9 may be considered as an extension of cathode conductor film 50.

In the embodiments of FIGS. 8 and 9, various features, components and interrelationships therebetween of aspects of embodiments of the present invention are depicted. However, the present invention is not limited to the particular embodiments of FIGS. 8 and 9 and the components, features and interrelationships therebetween as are illustrated in FIGS. 8 and 9 and described herein.

Referring to FIGS. 10-15 generally, the inventors have determined that material diffusion between the interconnect and adjacent components, e.g., an anode and/or an anode conductor film and/or cathode and/or cathode conductor film, may adversely affect the performance of certain fuel cell systems. Hence, some embodiments of the present invention include an electrically conductive chemical barrier (e.g., as discussed above, and/or chemical barrier 104, discussed below with respect to FIGS. 10-15) to prevent or reduce such material diffusion. In various embodiments, chemical barrier 104 may be configured to prevent or reduce material migration or diffusion at the interface between the interconnect and an anode, and/or between the interconnect and an anode conductor film, and/or between the interconnect and a cathode, and/or between the interconnect and a cathode conductor film which may improve the long term durability of the interconnect. For example, without a chemical barrier, material migration (diffusion) may take place at the interface between an interconnect formed of a precious metal cermet, and an anode conductor film and/or anode formed of a Ni-based cermet. The material migration may take place in both directions, e.g., Ni migrating from the anode conductive layer/conductor film and/or anode into the interconnect, and precious metal migrating from the interconnect into the conductive layer/conductor film and/or anode. The material migration may result in increased porosity at or near the interface between the interconnect and the anode conductor film and/or anode, and may result in the enrichment of one or more non or low-electronic conducting phases at the interface, yielding a higher area specific resistance (ASR), and hence resulting in reduced fuel cell performance. Material migration between the interconnect and the cathode and/or between the interconnect and the cathode conductor film may also or alternatively result in deleterious effects on fuel cell performance.

Accordingly, some embodiments employ a chemical barrier, e.g., chemical barrier 104, that is configured to prevent or reduce material migration or diffusion at the interface between the interconnect and an adjacent electrically conductive component, such as one or more of an anode, an anode conductive layer/conductor film, a cathode and/or a cathode conductive layer/conductor film, and hence prevent or reduce material migration (diffusion) that might otherwise result in deleterious effect, e.g., the formation of porosity and the enrichment of one or more non or low-electronic conducting phases at the interface. Chemical barrier 104 may be formed of one or both of two classes of materials; cermet and/or conductive ceramic. For the cermet, the ceramic phase may be one or more of an inert filler; a ceramic with low ionic conductivity, such as YSZ; and an electronic conductor. In various embodiments, e.g., for the anode side (e.g., for use adjacent to an anode and/or anode conductive layer/conductor film), chemical barrier 104 may be formed of one or more materials, including, without limitation, Ni cermet or Ni-precious metal cermet. The precious metal phase may be, for example and without limitation, one or more of Ag, Au, Pd, Pt, or one or more alloys of Ag, Au, Pd and/or Pt. The ceramic phase in the cermet may be, for example and without limitation, be at least one of YSZ (such as 3YSZ), ScSZ (such as 4ScSZ), doped ceria (such as $Gd_{0.1}Ce_{0.9}O_2$), $SrZrO_3$, pyrochlores of the composition $(M_{RE})_2Zr_2O_7$ (where $M_{RE}$=one or more rare earth cations, for example and without limitation La, Pr, Nd, Gd, Sm, Ho, Er, and/or Yb), for example and without limitation, $La_2Zr_2O_7$ and $Pr_2Zr_2O_7$, alumina, and $TiO_2$, or one or more electronically conductive ceramics, such as doped ceria (higher electronic conductivity at lower oxygen partial pressure to provide low enough ASR due to thin film), doped strontium titanate, LSCM ($La_{1-x}Sr_xCr_{1-y}Mn_yO_3$, x=0.15-0.35, y=0.25-0.5), and/or other doped lanthanum chromites and doped yttria chromites. In various embodiments, e.g., for the cathode side (e.g., for use adjacent to a cathode and/or cathode conductive layer/conductor film), chemical barrier 104 may be formed of one or more materials, including, without limitation precious metal cermet. The precious metal phase may be, for example and without limitation, one or more of Ag, Au, Pd, Pt, or one or more alloys of Ag, Au, Pd and/or Pt. The ceramic phase in the cermet may be, for example and without limitation, be at least one of YSZ, ScSZ, doped ceria, $SrZrO_3$, pyrochlores of the composition $(M_{RE})_2Zr_2O_7$ (where $M_{RE}$=one or more rare earth cations, for example and without limitation La, Pr, Nd, Gd, Sm, Ho, Er, and/or Yb), for example and without limitation, $La_2Zr_2O_7$ and $Pr_2Zr_2O_7$, alumina, and $TiO_2$, or one or more electronically conductive ceramics, such as LNF ($LaNi_xFe_{1-x}O_3$, such as x=0.6) LSM ($La_{1-x}Sr_xMnO_3$, x=0.15-0.3), LCM (such as $La_{0.8}Ca_{0.2}MnO_3$), Ruddlesden-Popper nickelates, LSF (such as $La_{0.8}Sr_{0.2}FeO_3$), LSCF ($La_{0.6}Sr_{0.4}CO_{0.2}Fe_{0.8}O_3$), LSCM ($La_{1-x}Sr_xCr_{1-y}Mn_yO_3$, x=0.15-0.35, y=0.5-0.75) doped yttrium chromites, and other doped lanthanum chromites. The selection of the specific material(s) for chemical barrier 104 may vary with the needs of the application, e.g., depending upon cost, ease of manufacturing, the type of materials used for the component(s) electrically adjacent to interconnect 16 and/or one of its subcomponents, e.g., blind primary conductor 52, auxiliary conductor 54 and auxiliary conductor 56.

One example of anode side chemical barrier materials is 15% Pd, 19% NiO, 66% NTZ, where NTZ is 73.6 wt % NiO, 20.0% $TiO_2$, 6.4% YSZ.

Another example of anode side chemical barrier materials is doped ceria, such as $Gd_{0.1}Ce_{0.9}O_2$.

Experimental testing with a chemical barrier, such as chemical barrier 104, in a fuel cell system yielded approximately 0.1% per thousand hour degradation rate in cell power output over the course of 1300 hours of testing using a chemical barrier formed of 30 wt %-Pd-70 wt % NTZ cermet (NTZ=NiO$_2$-3YSZ), disposed between an interconnect formed of 65Pd35Pt—YSZ cermet and an anode conductive layer formed of 20 wt % Pd—Ni-spinel. In a comparative test, but without the inclusion of a chemical barrier, such as chemical barrier 104, an interconnect formed of 50 v % (96Pd6Au)-50 v % YSZ cermet directly interfacing with an anode conductive layer formed of 20 wt % Pd—Ni-spinel showed significant degradation in about 10 hours of testing, and fuel cell failure at about 25 hours of testing resulting from material migration between the interconnect and the anode conductive layer. In another test, two fuel cells were tested using a chemical barrier 104 formed of a conductive ceramic (10 mol % Gd doped CeO$_2$) disposed between disposed between an anode conductor film and an interconnect. ASR for the interconnect showed no degradation after approximately 8000 hours of testing, and instead showed slight improvement, yielding final values of 0.05 ohm-cm$^2$ and 0.06 ohm-cm$^2$ in the two test articles.

Figure 10:
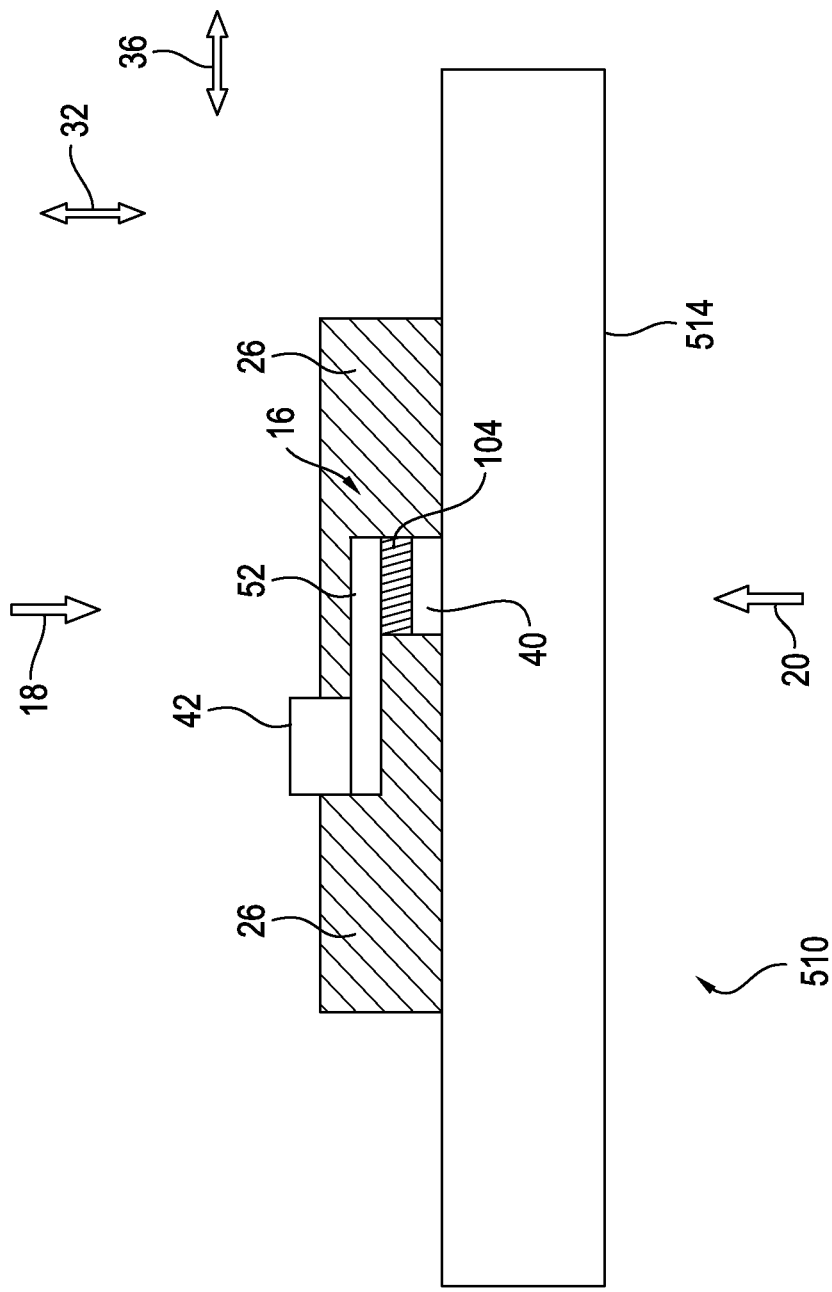
FIG. 10 schematically depicts some aspects of a non-limiting example of a cross section of an embodiment of the present invention having a chemical barrier.

Referring to FIG. 10, some aspects of a non-limiting example of an embodiment of a fuel cell system 510 disposed on a substrate 514 are schematically depicted. Fuel cell system 510 includes a chemical barrier 104. Fuel cell system 510 also includes some the components set forth above and described with respect to fuel cell system 10, e.g., including an interconnects 16 having a blind primary conductor 52; an oxidant side 18; a fuel side 20; electrolyte layers 26; anodes 40; and cathodes 42. Although only a single instance of interconnect 16, blind primary conductor 52, anode 40 and cathode 42 are depicted, and two instances of electrolyte layers 26 are depicted, it will be understood that fuel cell system 510 may include a plurality of each such components, e.g., arranged in series in direction 36, e.g., similar to embodiments described above. The description of substrate 14 applies equally to substrate 514. In fuel cell system 510, chemical barrier 104 is disposed between anode 40 and interconnect 16 (blind primary conductor 52), extending in direction 32 between anode 40 and interconnect 16, and is configured to prevent material migration between anode 40 and interconnect 16 (blind primary conductor 52). Chemical barrier 104 may be formed from one or more of the materials set forth above with respect to the embodiments of FIGS. 10-15.

Figure 11:
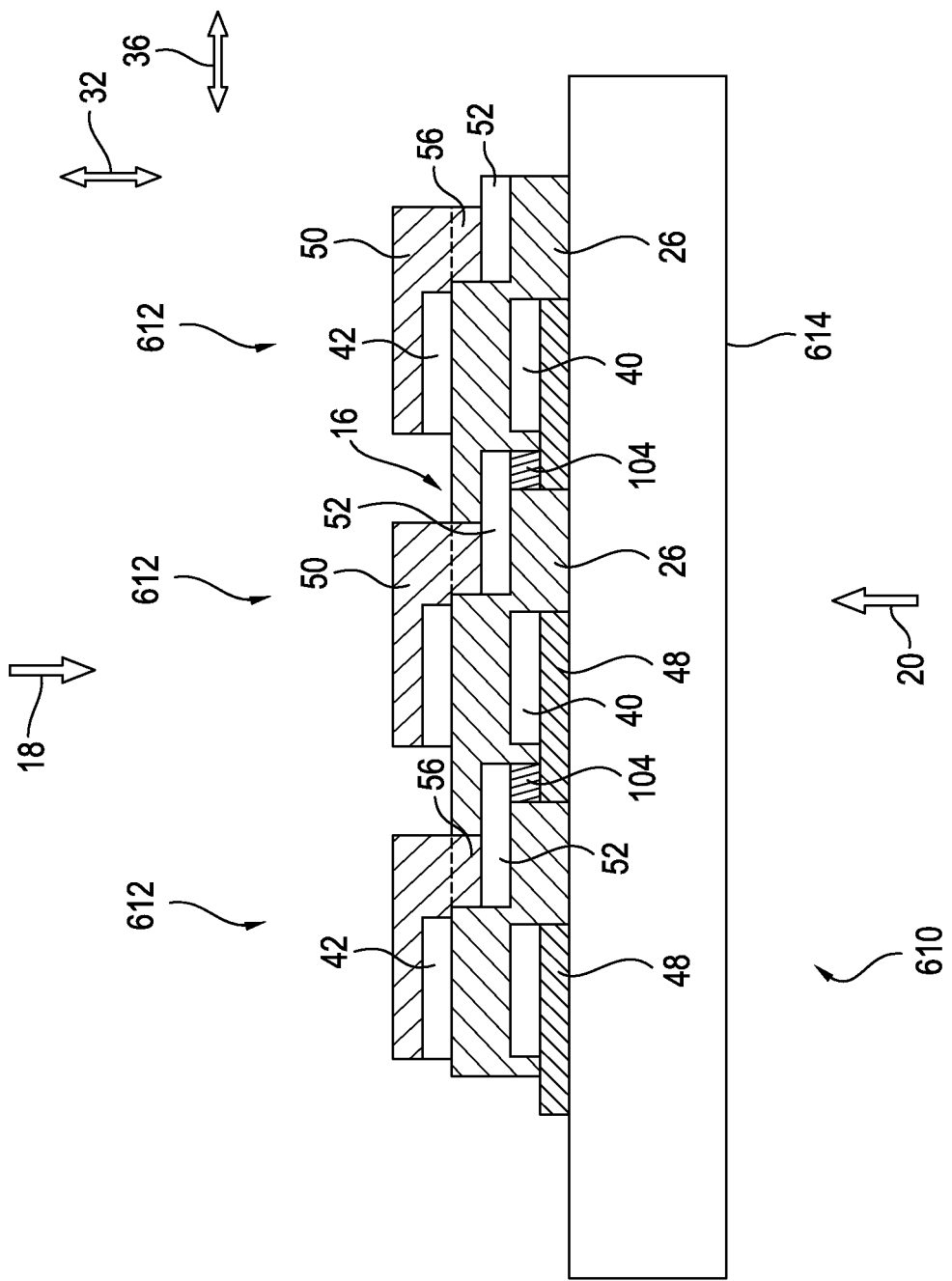
FIG. 11 schematically depicts some aspects of a non-limiting example of a cross section of an embodiment of the present invention having a chemical barrier.

Referring to FIG. 11, some aspects of a non-limiting example of an embodiment of a fuel cell system 610 are schematically depicted. Fuel cell system 610 includes a plurality of electrochemical cells 612 disposed on a substrate 614, each electrochemical cell 612 including a chemical barrier 104. Fuel cell system 610 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 614. In fuel cell system 610, chemical barrier 104 is disposed between anode conductor film 48 and interconnect 16 (blind primary conductor 52), extending in direction 32 between anode conductor film 48 and interconnect 16, and is configured to prevent material migration between anode conductor film 48 and interconnect 16 (blind primary conductor 52). Chemical barrier 104 may be formed from one or more of the materials set forth above with respect to the embodiments of FIGS. 10-15. In fuel cell system 610, a portion of electrolyte layer 26 is disposed between anode 40 and chemical barrier 104, extending in direction 36 between anode 40 and chemical barrier 104.

Figure 12:
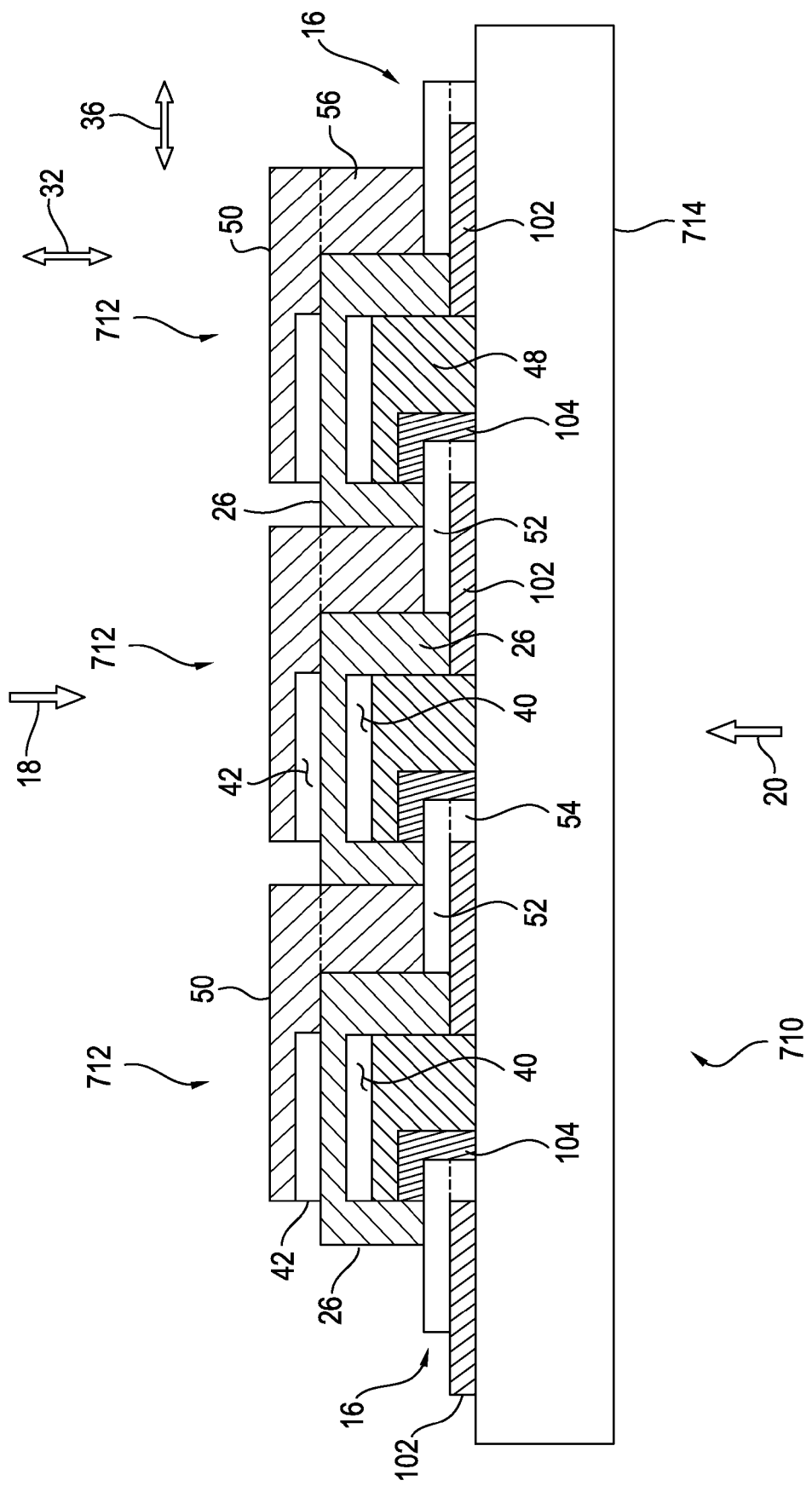
FIG. 12 schematically depicts some aspects of a non-limiting example of a cross section of an embodiment of the present invention having a chemical barrier and a ceramic seal.

Referring to FIG. 12, some aspects of a non-limiting example of an embodiment of a fuel cell system 710 are schematically depicted. Fuel cell system 710 includes a plurality of electrochemical cells 712 disposed on a substrate 714, each electrochemical cell 712 including a ceramic seal 102 and a chemical barrier 104. Fuel cell system 710 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 714. In fuel cell system 710, ceramic seal 102 is positioned to prevent or reduce leakage of gases and liquids from substrate 714 into interconnect 16 (blind interconnect 52), and extends in direction 36 between the anode conductor film 48 of one electrochemical cell 712 and the auxiliary conductor 54 of an adjacent electrochemical cell 712.

In fuel cell system 710, ceramic seal 102 is positioned vertically (in direction 32) between porous substrate 714 on the bottom and blind primary conductor 52 of interconnect 16 and electrolyte 26 on the top, thereby preventing the leakages of gases and liquids from substrate 714 into the portions of blind primary conductor 52 (and electrolyte 26) that are overlapped by ceramic seal 102. In other embodiments, ceramic seal 102 may be disposed in other suitable locations in addition to or in place of that illustrated in FIG. 12. Ceramic seal 102 may be formed of one or more of the materials set forth above with respect to the embodiment of FIG. 7. A portion of blind primary conductor 52 is embedded between ceramic seal 102 on the bottom and electrolyte 26 on the top. The diffusion distance in the embodiment of FIG. 12 is primarily defined by the length of the overlap of blind primary conductor 52 by both ceramic seal 102 and electrolyte 26 in direction 36.

In fuel cell system 710, chemical barrier 104 is disposed between anode conductor film 48 and interconnect 16 (blind primary conductor 52), extending in direction 32 between anode conductor film 48 and both blind primary conductor 52 and auxiliary conductor 54 of interconnect 16, and is configured to prevent material migration between anode conductor film 48 and blind primary conductor 52 and auxiliary conductor 54. Chemical barrier 104 may be formed from one or more of the materials set forth above with respect to the embodiments of FIGS. 10-15.

Figure 13:
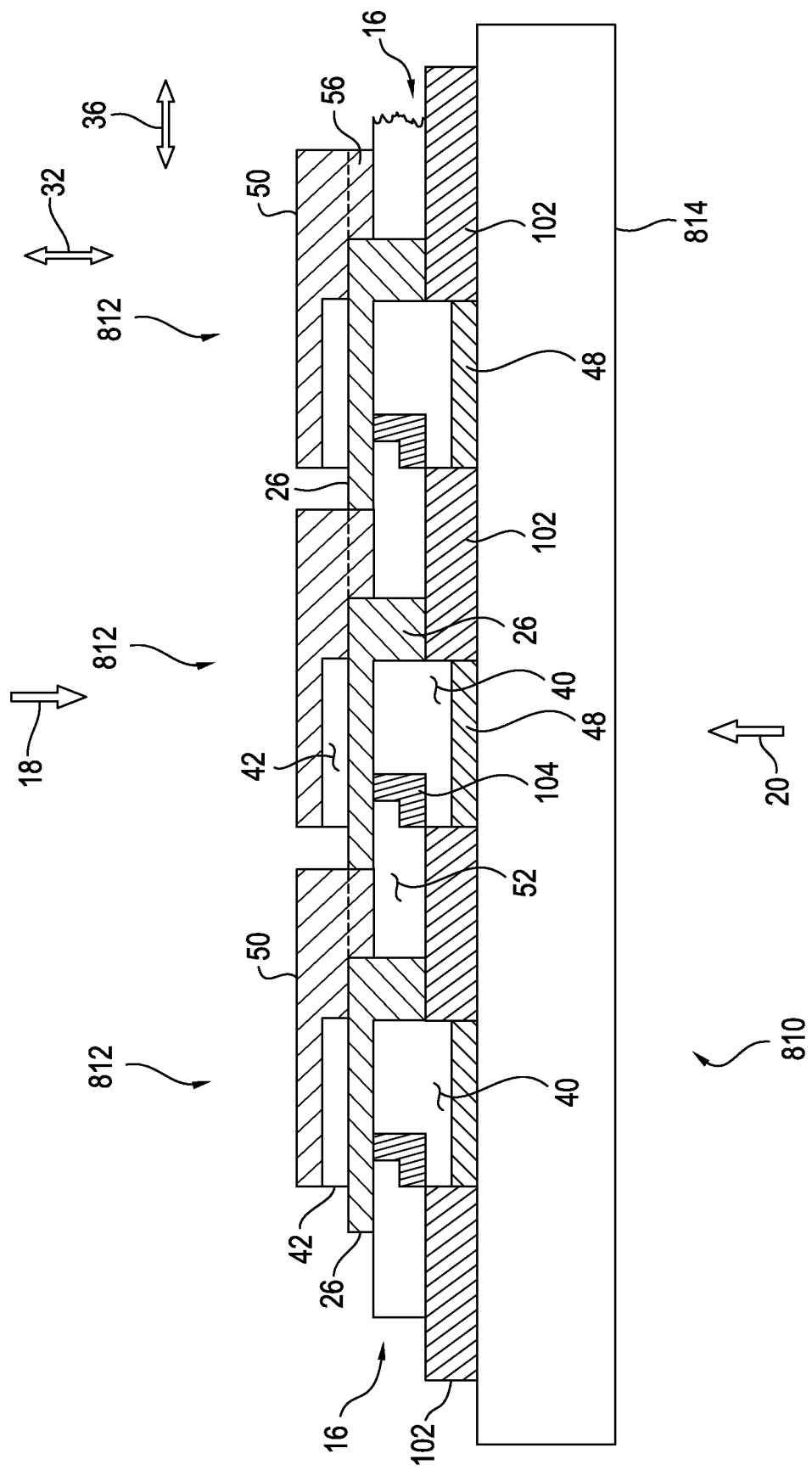
FIG. 13 schematically depicts some aspects of a non-limiting example of a cross section of an embodiment of the present invention having a chemical barrier and a ceramic seal.

Referring to FIG. 13, some aspects of a non-limiting example of an embodiment of a fuel cell system 810 are schematically depicted. Fuel cell system 810 includes a plurality of electrochemical cells 812 disposed on a substrate 814, each electrochemical cell 812 including a ceramic seal 102 and a chemical barrier 104. Fuel cell system 810 also includes the components set forth above and described with respect to fuel cell system 10, e.g., including interconnects 16 having blind primary conductors 52 and auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 814.

In fuel cell system 810, ceramic seal 102 is positioned to prevent or reduce leakage of gases and liquids from substrate 814 into interconnect 16 (blind interconnect 52), and extends in direction 36 between the anode 40 and anode conductor film 48 of one electrochemical cell 812 and the anode 40 and anode conductor film 48 of an adjacent electrochemical cell 812. In fuel cell system 810, ceramic seal 102 is positioned vertically (in direction 32) between porous substrate 814 on the bottom and blind primary conductor 52 of interconnect 16 and electrolyte 26 on the top, thereby preventing the leakages of gases and liquids from substrate 714 into the portions of blind primary conductor 52 (and electrolyte 26) that are overlapped by ceramic seal 102. In other embodiments, ceramic seal 102 may be disposed in other suitable locations in addition to or in place of that illustrated in FIG. 13. Ceramic seal 102 may be formed of one or more of the materials set forth above with respect to the embodiment of FIG. 7. A portion of blind primary conductor 52 is embedded between ceramic seal 102 on the bottom, and electrolyte 26 on the top. The diffusion distance in the embodiment of FIG. 13 is primarily defined by the length of the overlap of blind primary conductor 52 by both ceramic seal 102 and electrolyte 26 in direction 36.

In fuel cell system 810, chemical barrier 104 is disposed between anode 40 and blind primary conductor 52, and is configured to prevent material migration between anode 40 and blind primary conductor 52. In one form, chemical barrier 104 also functions as auxiliary conductor 54. In other embodiments, auxiliary conductor 54 may be formed separately from chemical barrier 104. Chemical barrier 104 may be formed from one or more of the materials set forth above with respect to the embodiments of FIGS. 10-15.

Figure 14:
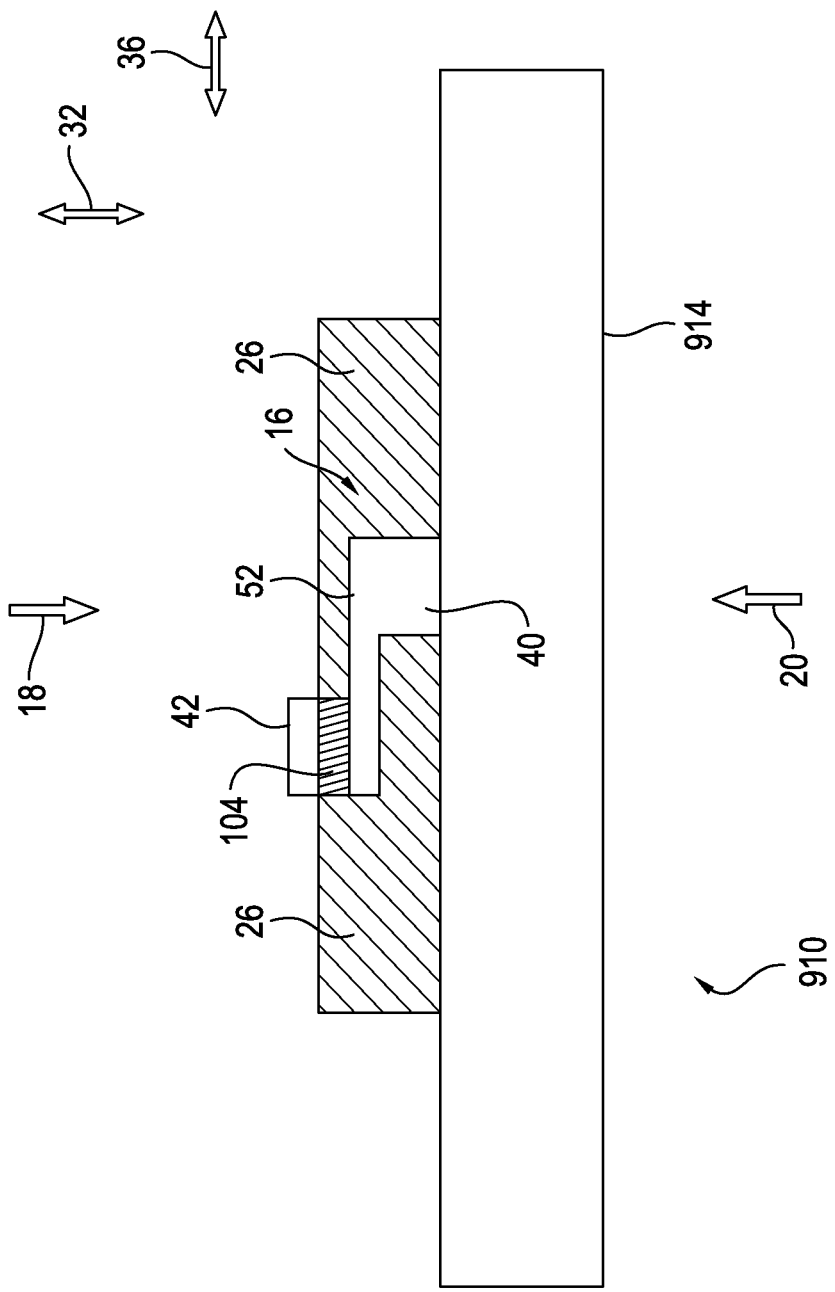
FIG. 14 schematically depicts some aspects of a non-limiting example of a cross section of an embodiment of the present invention having a chemical barrier.

Referring to FIG. 14, some aspects of a non-limiting example of an embodiment of a fuel cell system 910 disposed on a substrate 914 are schematically depicted. Fuel cell system 910 includes a chemical barrier 104. Fuel cell system 910 also includes some the components set forth above and described with respect to fuel cell system 10, e.g., including an interconnects 16 having a blind primary conductor 52; an oxidant side 18; a fuel side 20; electrolyte layers 26; anodes 40; and cathodes 42. Although only a single instance of interconnect 16, blind primary conductor 52, anode 40 and cathode 42 are depicted, and two instances of electrolyte layers 26 are depicted, it will be understood that fuel cell system 910 may include a plurality of each such components, e.g., arranged in series in direction 36, e.g., similar to embodiments described above. The description of substrate 14 applies equally to substrate 914. In fuel cell system 910, chemical barrier 104 is disposed between cathode 42 and interconnect 16 (blind primary conductor 52), extending in direction 32 between cathode 42 and interconnect 16, and is configured to prevent material migration between cathode 42 and interconnect 16 (blind primary conductor 52). Chemical barrier 104 may be formed from one or more of the materials set forth above with respect to the embodiments of FIGS. 10-15.

Figure 15:
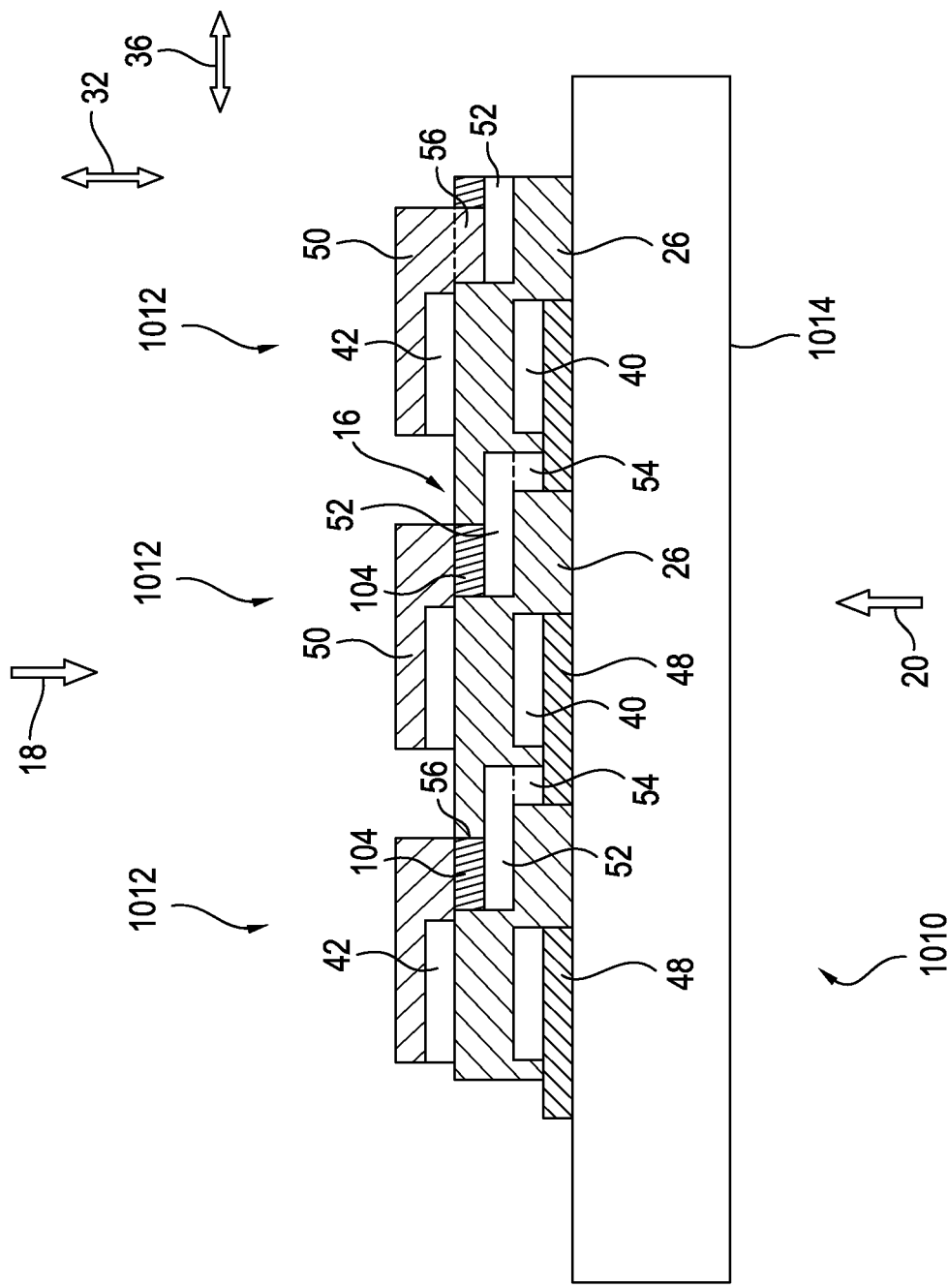
FIG. 15 schematically depicts some aspects of a non-limiting example of a cross section of an embodiment of the present invention having a chemical barrier.

Referring to FIG. 15, some aspects of a non-limiting example of an embodiment of a fuel cell system 1010 are schematically depicted. Fuel cell system 1010 includes a plurality of electrochemical cells 612 disposed on a substrate 1014, each electrochemical cell 1012 including a chemical barrier 104. Fuel cell system 1010 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42; anode conductor films 48 and cathode conductor films 50. The description of substrate 14 applies equally to substrate 1014. In fuel cell system 1010, chemical barrier 104 is disposed between cathode conductor film 50 and interconnect 16 (blind primary conductor 52), extending in direction 32 between cathode conductor film 50 and interconnect 16 (blind primary conductor 52), and is configured to prevent material migration between cathode conductor film 50 and interconnect 16 (blind primary conductor 52). Chemical barrier 104 may be formed from one or more of the materials set forth above with respect to the embodiments of FIGS. 10-15. In the embodiment of FIG. 15, chemical barrier 104 also functions as auxiliary conductor 56.

In the embodiments of FIGS. 10-15, various features, components and interrelationships therebetween of aspects of embodiments of the present invention are depicted. However, the present invention is not limited to the particular embodiments of FIGS. 10-15 and the components, features and interrelationships therebetween as are illustrated in FIGS. 10-15 and described herein.

Referring to FIGS. 16-19 generally, the inventors have determined that in some fuel cells, under some operating conditions, the cathode conductive layer/conductor film, the electrolyte, and portions of the interconnect, e.g., vias, can form parasitic cells within or between each electrochemical cell, particularly where there is overlap between the cathode conductive layer/conductor film and the electrolyte. In the parasitic cells, the cathode conductive layer/conductor film functions as a cathode, and the interconnect, e.g., vias formed of precious metal cermet, function as an anode. The parasitic cells consume fuel during fuel cell operation, thereby reducing the efficiency of the fuel cell system. In addition, the steam generated by the parasitic cells may create local high oxygen partial pressure that may result in the oxidation of Ni that may have diffused into precious metal phase of the interconnect (e.g., via) materials, resulting in degradation of the interconnect.

The inventors performed tests that confirmed the existence of parasitic cells. The tests confirmed that, although significant degradation did not occur at some temperatures, e.g., 900° C., under the testing times, degradation of the interconnect occurred at higher operating temperatures, e.g., 925° C. after approximately 700 hours of testing. Post test analysis showed Ni migration from the anode conductive layer/conductor film side to the cathode conductive layer/conductor film side of the interconnect through the precious metal phase in blind primary conductor 52, which was accelerated by the higher operating temperature. A high oxygen partial pressure resulting from steam formed by the parasitic cells caused Ni oxidation at the interface of extended electrolyte 26 and blind primary interconnect 52 near the boundary between the cathode conductive layer/conductor film and the electrolyte, which segregated from the precious metal of the interconnect. Continued NiO accumulation at the interface between the blind primary conductor 52 and the electrolyte 26, and continued Ni migration would likely result in failure of the interconnect.

In order to prevent overlap between the cathode conductive layer/conductor film and the electrolyte, in various embodiments the inventors employed a separation feature (gap 106 of FIGS. 16 and 17; and insulator 108 of FIGS. 18 and 19) between the cathode conductive layer/conductor film and the electrolyte to separate, i.e., space apart, the cathode conductive layer/conductor film and the electrolyte from contacting each other, thus eliminating the parasitic cells. Testing of fuel cell systems with a separation feature in the form of gap 106 (and also including a chemical barrier 104 formed of Pd—Ni alloy cermet) for approximately 2000 hours, including approximately 1000 hours at aggressive conditions (925° C. and fuel consisting of 20% $H_2$, 10% CO, 19% $CO_2$, 47% steam and 4% $N_2$) did not result in degradation of the interconnect. Accordingly, some embodiments of the present invention include a separation feature, e.g., gap 106, between the cathode conductive layer/conductor film and the electrolyte, which prevents the establishment of parasitic cells.

Figure 16:
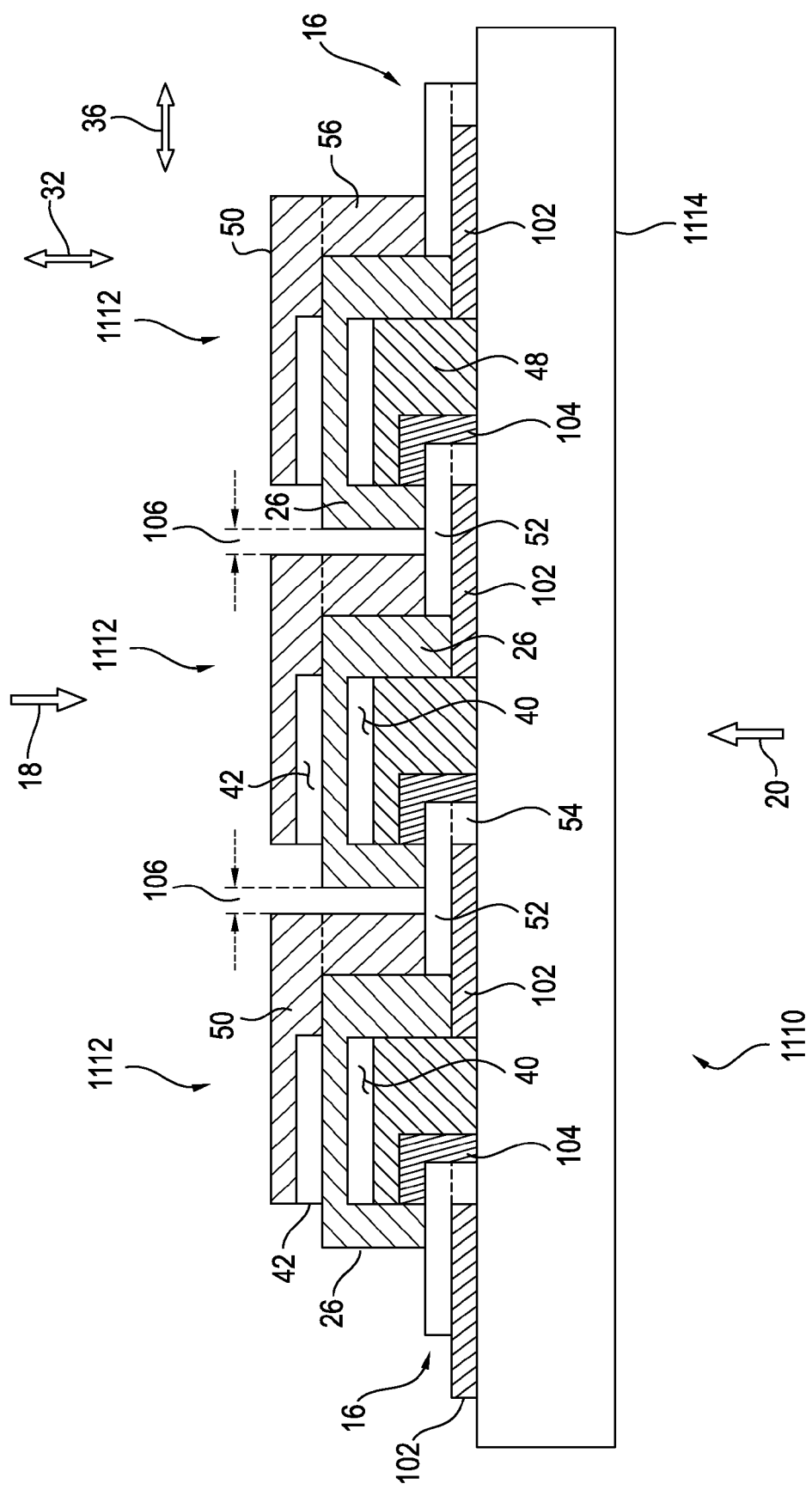
FIG. 16 schematically depicts some aspects of a non-limiting example of a cross section of an embodiment of the present invention having a chemical barrier, a ceramic seal, and a gap between a cathode conductor film and an electrolyte layer.

Referring to FIG. 16, some aspects of a non-limiting example of an embodiment of a fuel cell system 1110 are schematically depicted. Fuel cell system 1110 includes a plurality of electrochemical cells 1112 disposed on a substrate 1114, each electrochemical cell 1112 including a ceramic seal 102, a chemical barrier 104, and a separation feature in the form of gap 106. Fuel cell system 1110 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 1114. Gap 106 extends in direction 36 between cathode conductor film 50 (e.g., formed of one or more cathode conductive layers 30) and electrolyte layer 26.

In fuel cell system 1110, ceramic seal 102 is positioned to prevent or reduce leakage of gases and liquids from substrate 1114 into interconnect 16 (blind primary conductor 52), and extends in direction 36 between the anode conductor film 48 of one electrochemical cell 1112 and the auxiliary conductor 54 of an adjacent electrochemical cell 1112.

In fuel cell system 1110, ceramic seal 102 is positioned vertically (in direction 32) between porous substrate 1114 on the bottom and blind primary conductor 52 of interconnect 16 and electrolyte 26 on the top, thereby preventing the leakages of gases and liquids from substrate 1114 into the portions of blind primary conductor 52 (and electrolyte 26) that are overlapped by ceramic seal 102. In other embodiments, ceramic seal 102 may be disposed in other suitable locations in addition to or in place of that illustrated in FIG. 12. Ceramic seal 102 may be formed of one or more of the materials set forth above with respect to the embodiment of FIG. 7. A portion of blind primary conductor 52 is embedded between ceramic seal 102 on the bottom, and extended electrolyte 26 on the top. The diffusion distance in the embodiment of FIG. 16 is primarily defined by the length of the overlap of blind primary conductor 52 by both ceramic seal 102 and electrolyte 26 in direction 36.

In fuel cell system 1110, chemical barrier 104 is disposed between anode conductor film 48 and interconnect 16 (blind primary conductor 52), extending in direction 32 between anode conductor film 48 and both blind primary conductor 52 and auxiliary conductor 54 of interconnect 16, and is configured to prevent material migration between anode conductor film 48 and blind primary conductor 52 and auxiliary conductor 54. Chemical barrier 104 may be formed from one or more of the materials set forth above with respect to the embodiments of FIGS. 10-15.

In fuel cell system 1110, gap 106 is configured to prevent formation of a parasitic fuel cell between cathode conductor film 50, electrolyte layer 26 and blind primary conductor 52. Although gap 106 in the embodiment of FIG. 16 is employed in conjunction with a fuel cell system having ceramic seal 102, chemical barrier 104 and anode conductor film 48, in other embodiments, gap 106 may be employed in fuel cell systems that do not include components corresponding to one or more of ceramic seal 102, chemical barrier 104 and anode conductor film 48.

Figure 17:
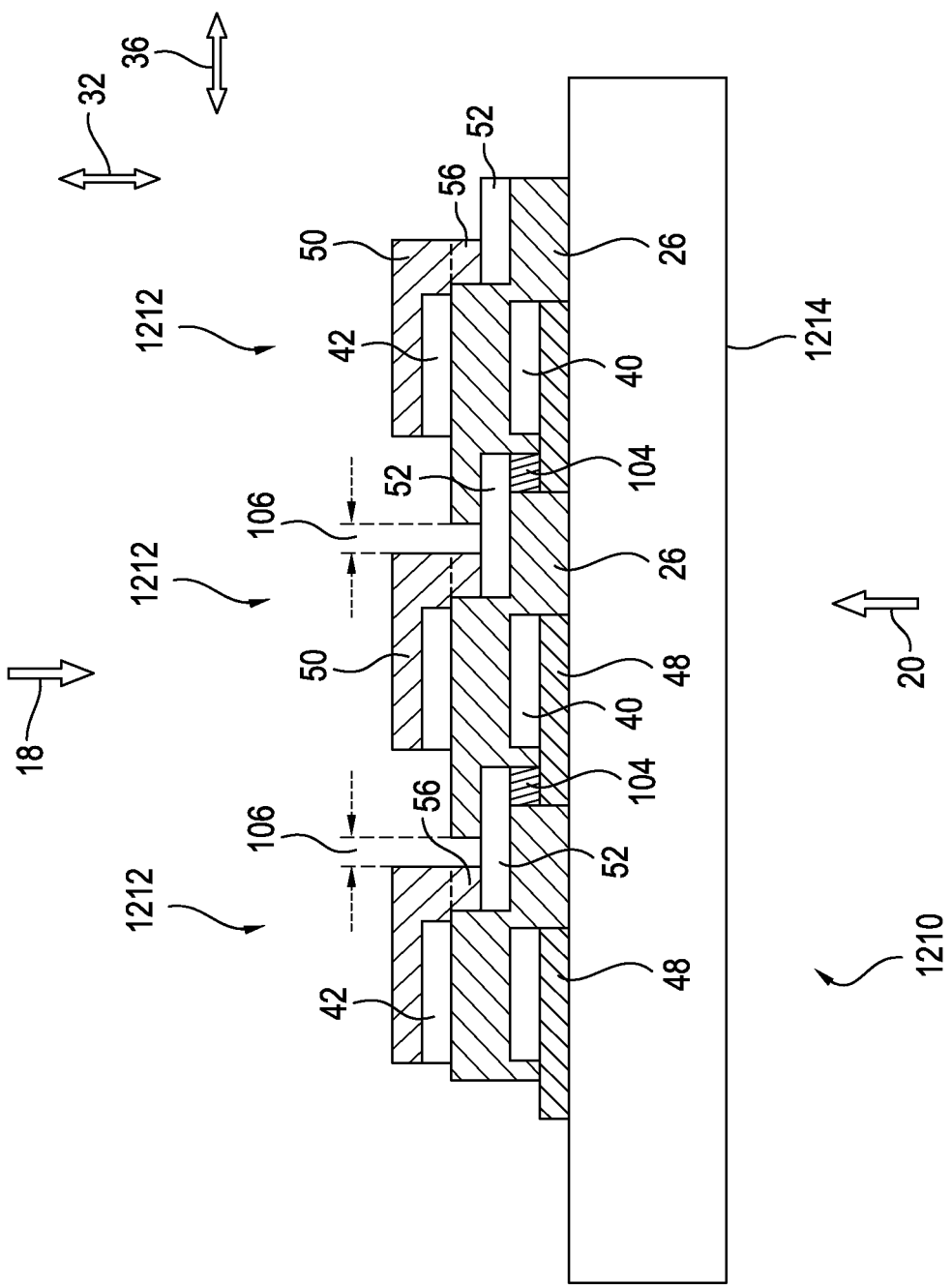
FIG. 17 schematically depicts some aspects of a non-limiting example of a cross section of an embodiment of the present invention having a chemical barrier, a ceramic seal, and a gap between an interconnect auxiliary conductor and an electrolyte layer.

Referring to FIG. 17, some aspects of a non-limiting example of an embodiment of a fuel cell system 1210 are schematically depicted. Fuel cell system 1210 includes a plurality of electrochemical cells 1212 disposed on a substrate 1214, each electrochemical cell 1212 including a chemical barrier 104 and a separation feature in the form of gap 106. Fuel cell system 1210 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 1214.

In fuel cell system 1210, chemical barrier 104 is disposed between anode conductor film 48 and interconnect 16 (blind primary conductor 52), extending in direction 32 between anode conductor film 48 and interconnect 16, and is configured to prevent material migration between anode conductor film 48 and interconnect 16 (blind primary conductor 52). Chemical barrier 104 may be formed from one or more of the materials set forth above with respect to the embodiments of FIGS. 10-15. In fuel cell system 1210, a portion of electrolyte layer 26 is disposed between anode 40 and chemical barrier 104, extending in direction 36 between anode 40 and chemical barrier 104.

In fuel cell system 1210, gap 106 is configured to prevent formation of a parasitic fuel cell between auxiliary conductor 56 (formed of the same material as cathode conductor film 50), electrolyte layer 26 and blind primary conductor 52. Although gap 106 in the embodiment of FIG. 17 is employed in conjunction with a fuel cell system having chemical barrier 104 and anode conductor film 48, in other embodiments, gap 106 may be employed in fuel cell systems that do not include components corresponding to one or more of chemical barrier 104 and anode conductor film 48.

Figure 18:
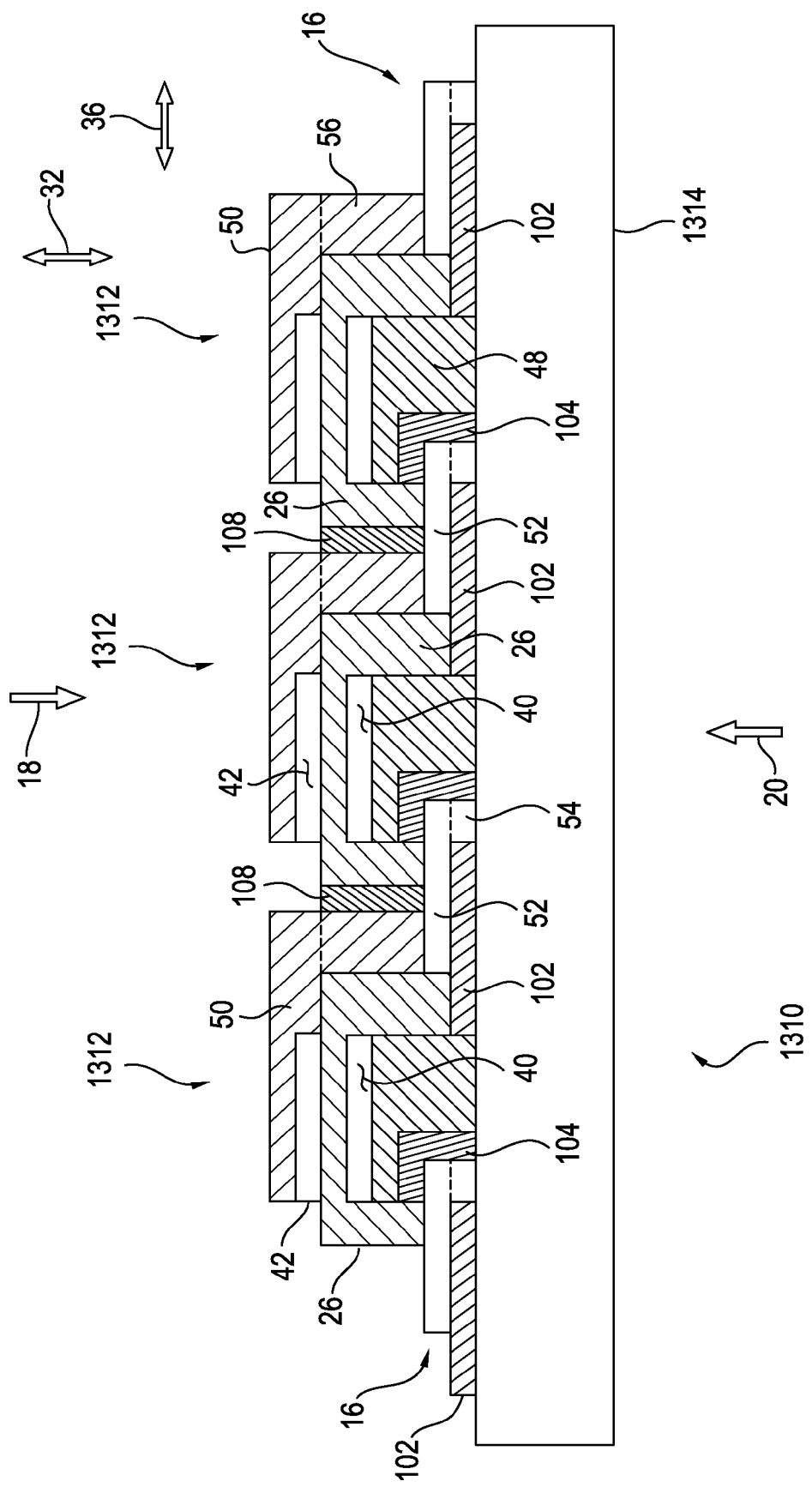
FIG. 18 schematically depicts some aspects of a non-limiting example of a cross section of an embodiment of the present invention having a chemical barrier, a ceramic seal, and an insulator between a cathode conductor film and an electrolyte layer.

Referring to FIG. 18, some aspects of a non-limiting example of an embodiment of a fuel cell system 1310 are schematically depicted. Fuel cell system 1310 includes a plurality of electrochemical cells 1312 disposed on a substrate 1314, each electrochemical cell 1312 including a ceramic seal 102, a chemical barrier 104, and a separation feature in the form of an insulator 108. Fuel cell system 1310 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 1314. Insulator 108 extends in direction 36 between cathode conductor film 50 (e.g., formed of one or more cathode conductive layers 30) and electrolyte layer 26.

In fuel cell system 1310, ceramic seal 102 is positioned to prevent or reduce leakage of gases and liquids from substrate 1314 into interconnect 16 (blind primary conductor 52), and extends in direction 36 between the anode conductor film 48 of one electrochemical cell 1312 and the auxiliary conductor 54 of an adjacent electrochemical cell 1312.

In fuel cell system 1310, ceramic seal 102 is positioned vertically (in direction 32) between porous substrate 1314 on the bottom and blind primary conductor 52 of interconnect 16 and electrolyte 26 on the top, thereby preventing the leakages of gases and liquids from substrate 1314 into the portions of blind primary conductor 52 (and electrolyte 26) that are overlapped by ceramic seal 102. In other embodiments, ceramic seal 102 may be disposed in other suitable locations in addition to or in place of that illustrated in FIG. 12. Ceramic seal 102 may be formed of one or more of the materials set forth above with respect to the embodiment of FIG. 7. A portion of blind primary conductor 52 is embedded between ceramic seal 102 on the bottom, and extended electrolyte 26 on the top. The diffusion distance in the embodiment of FIG. 18 is primarily defined by the length of the overlap of blind primary conductor 52 by both ceramic seal 102 and electrolyte 26 in direction 36.

In fuel cell system 1310, chemical barrier 104 is disposed between anode conductor film 48 and interconnect 16 (blind primary conductor 52), extending in direction 32 between anode conductor film 48 and both blind primary conductor 52 and auxiliary conductor 54 of interconnect 16, and is configured to prevent material migration between anode conductor film 48 and blind primary conductor 52 and auxiliary conductor 54. Chemical barrier 104 may be formed from one or more of the materials set forth above with respect to the embodiments of FIGS. 10-15.

In fuel cell system 1310, insulator 108 is configured to prevent formation of a parasitic fuel cell between cathode conductor film 50, electrolyte layer 26 and blind primary conductor 52. In one form, insulator 108 is formed from an insulating non-conductive materials, such as aluminum oxide ($Al_2O_3$), pyrochlore, such as In other embodiments, $La_2Zr_2O_7$, $Pr_2Zr_2O_7$, and $SrZrO_3$. Other materials may be employed to form insulator 108, e.g., one or more other types of non-conducting ceramics in addition to or in place of aluminum oxide. Although insulator 108 in the embodiment of FIG. 16 is employed in conjunction with a fuel cell system having ceramic seal 102, chemical barrier 104 and anode conductor film 48, in other embodiments, insulator 108 may be employed in fuel cell systems that do not include components corresponding to one or more of ceramic seal 102, chemical barrier 104 and anode conductor film 48.

Figure 19:
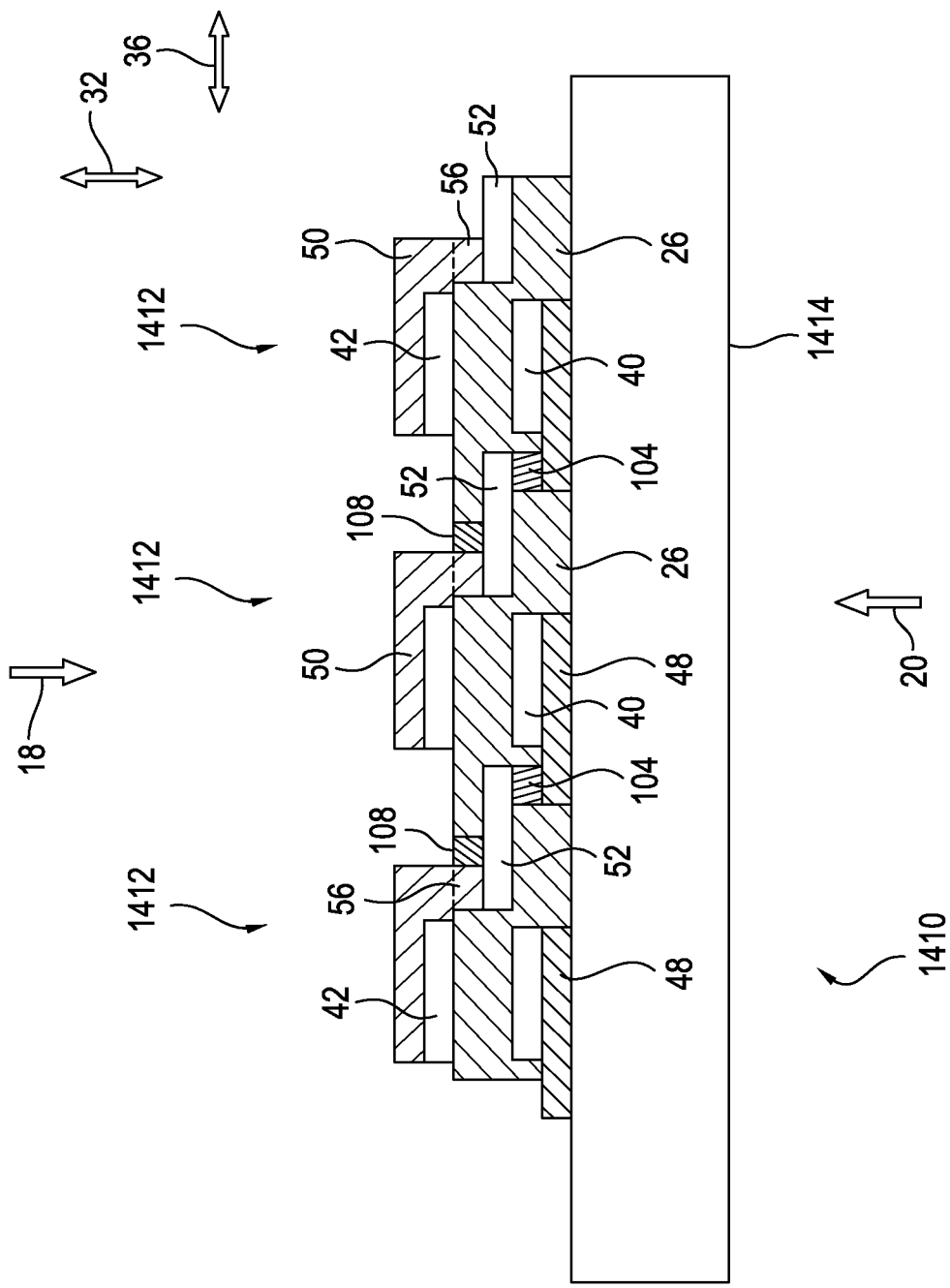
FIG. 19 schematically depicts some aspects of a non-limiting example of a cross section of an embodiment of the present invention having a chemical barrier, a ceramic seal, and an insulator between an interconnect auxiliary conductor and an electrolyte layer.

Referring to FIG. 19, some aspects of a non-limiting example of an embodiment of a fuel cell system 1410 are schematically depicted. Fuel cell system 1410 includes a plurality of electrochemical cells 1412 disposed on a substrate 1414, each electrochemical cell 1412 including a chemical barrier 104 and a separation feature in the form of insulator 108. Fuel cell system 1410 also includes the components set forth above and described with respect to fuel cell system 10, e.g., including interconnects 16 having blind primary conductors 52 and blind auxiliary conductors or vias 54 and 56; an oxidant side 18; a fuel side 20; electrolyte layers 26; anodes 40; cathodes 42, anode conductor films 48 and cathode conductor films 50. The description of substrate 14 applies equally to substrate 1414.

In fuel cell system 1410, chemical barrier 104 is disposed between anode conductor film 48 and interconnect 16 (blind primary conductor 52), extending in direction 32 between anode conductor film 48 and interconnect 16, and is configured to prevent material migration between anode conductor film 48 and interconnect 16 (blind primary conductor 52). Chemical barrier 104 may be formed from one or more of the materials set forth above with respect to the embodiments of FIGS. 10-15. In fuel cell system 1410, a portion of electrolyte layer 26 is disposed between anode 40 and chemical barrier 104, extending in direction 36 between anode 40 and chemical barrier 104.

In fuel cell system 1410, insulator 108 is configured to prevent formation of a parasitic fuel cell between auxiliary conductor 56 (formed of the same material as cathode conductor film 50), electrolyte layer 26 and blind primary conductor 52. Insulator 108 may be formed of the materials set forth above in the embodiment of FIG. 18. Although insulator 108 in the embodiment of FIG. 19 is employed in conjunction with a fuel cell system having chemical barrier 104 and anode conductor film 48, in other embodiments, insulator 108 may be employed in fuel cell systems that do not include components corresponding to one or more of chemical barrier 104 and anode conductor film 48.

In the embodiments of FIGS. 16-19, various features, components and interrelationships therebetween of aspects of embodiments of the present invention are depicted. However, the present invention is not limited to the particular embodiments of FIGS. 16-19 and the components, features and interrelationships therebetween as are illustrated in FIGS. 16-19 and described herein.

As mentioned above with respect to FIGS. 16-19, under certain conditions, parasitic cells may be undesirably formed. The embodiments discussed above with respect to FIGS. 16-19 provide certain approaches to resolving the parasitic cell problem. The inventors have also created other approaches to solving the parasitic cell problem, based on material selection, e.g., the material from which the interconnect and/or vias (e.g., interconnect 16, including blind primary conductor 52, auxiliary conductor 54 and/or auxiliary conductor 56, and/or other interconnect and/or via configurations not mentioned herein) are formed. In one form, for an alternate cermet material, precious metal-$La_2Zr_2O_7$ pyrochlore cermet may be employed for primary interconnect material for segmented-in-series fuel cell, or via material for multi-layer ceramic interconnect. In the such a cermet material, $La_2Zr_2O_7$ pyrochlore could fully replace doped zirconia, or partially replace doped zirconia to keep ionic phase below its percolation to eliminate or reduce ionic conduction.

In one form, the composition of the interconnect and/or via(s), e.g., one or more of the previously mentioned compositions for the interconnect and/or via(s), is altered to include non-ionic conducting ceramic phases in the composition of the interconnect and/or via(s).

For example, in one form, the interconnect and/or via may be formed, all or in part, of a cermet, such as those previously described with respect to interconnect 16, including blind primary conductor 52, auxiliary conductor 54 and/or auxiliary conductor 56, but also or alternatively including one or more non-ionic conductive ceramic phases. Examples include, without limitation, $SrZrO_3$, $La_2Zr_2O_7$ pyrochlore, $Pr_2Zr_2O_7$ pyrochlore, $BaZrO_3$, $MgAl_2O_4$ spinel, $NiAl_2O_4$ spinel, $MgCr_2O_4$ spinel, $NiCr_2O_4$ spinel, $Y_3Al_5O_{12}$ and other garnets with various A- and B-site substitution, and alumina. Other non-ionic conductive ceramic phases are also contemplated herein in addition to or in place of the examples set forth herein. Considerations for materials may include the coefficient of thermal expansion of the ceramic phase(s), e.g., relative to the coefficient thermal expansion of the porous substrate. In some embodiments, preferred materials for chemical compatibility with adjacent fuel cell layers may include precious metal-pyrochlore cermets, wherein the general class of pyrochlores is $(M_{RE})_2Zr_2O_7$, wherein $M_{RE}$ is a rare earth cation, for example and without limitation La, Pr, Nd, Gd, Sm, Ho, Er, and/or Yb.

In other embodiments, nonionic phases such as $SrZrO_3$, $MgAl_2O_4$ spinel, $NiAl_2O_4$ spinel, alumina and pyrochlore compositions partially or completely replace the ionic conducting YSZ, e.g., of previously described interconnects and/or vias. Preferably, pyrochlore powders and/or one or more of the other nonionic phases replace YSZ sufficiently to render the balance of the YSZ to be below a percolation threshold to eliminate ionic conductivity across the interconnect/via. The YSZ volume fraction of the via is purposely reduced to less than 30 v % to minimize any ionic conductivity within the via material.

In one form, the composition of the interconnect and/or via(s), e.g., one or more of the previously mentioned compositions for the interconnect and/or via(s), is altered to include a reactant phase to form non-ionic conducting ceramic phases during firing of the fuel cell, e.g., by the inclusion of rare earth oxides in the compound used to form the interconnect/via(s).

For example, in some embodiments, all or portions interconnect 16 or other interconnects or vias may include a reactant phase in the form of rare earth oxide, e.g., within the screen printing ink, at less than the stoichiometric ratio to form pyrochlore being one mole of the oxides of La, Pr, Nd, Gd, Sm, Ho, Er, Yb to two moles of the zirconia content of the via. In the overall cermet composition (e.g., cermet compositions for all or part of interconnect 16 set forth herein) which reacts with the YSZ during firing of the fuel cell to form pyrochlore within the interconnect/via and adjacent to the electrolyte, e.g., electrolyte 26. In one form, the minimum rare earth oxide required is about 13 mole % ceramic composition in order to reduce YSZ phase below 30 v % percolation. In other embodiments, other rare earth oxide amounts may be employed. The zirconia phase may still be able to exist at greater than the percolation threshold, since the insulating pyrochlore phase could form along grain boundaries. However, in some embodiments, it would be preferable to add sufficient rare earth oxides to take the YSZ phase content to below the percolation threshold on a bulk composition basis. Similar to the pyrochlores, $SrZrO_3$ nonionic phases could be created in-situ through addition of SrO powder as a reactant phase, e.g., to the interconnect inks, at less than the stoichimetric ratio of 1 mole SrO to 1 mole $ZrO_2$.

In still other embodiments, all or portions interconnect 16 or other interconnects or vias may include a content of rare earth oxide, e.g., within the screen printing ink, at greater than the stoichiometric ratio of pyrochlore being one mole of the oxides, e.g., of La, Pr, Nd, Gd, Sm, Ho, Er, and/or Yb, to two moles of the zirconia content of the via in the overall cermet composition (e.g., cermet compositions for all or part of interconnect 16 set forth herein) which reacts with the YSZ during firing of the fuel cell to form pyrochlore within the interconnect/via, and the unreacted rare earth oxide will further react with the extended electrolyte in the vicinity of the interconnect during electrolyte firing to form a pyrochlore film on the electrolyte surface, e.g., on the surface of electrolyte 26, which will sufficiently disrupt the pathways for oxygen ionic conductivity. In form, the rare earth oxide amount is from 33 mole % to 50 mole % based on the total ceramic phase. In other embodiments, other rare earth oxide amounts may be employed. The excess rare earth oxide may ensure the absence of ionic conductivity. However, too much excess rare earth remaining within the interconnect/via could cause the via to be susceptible to moisture induced damage on phase change due to the rare earth hydroxides. Hence, it is desirable in some embodiments to limit the amount of rare earth oxides to less than 10% over the stoichiometric ratio. Similar to the pyrochlores, $SrZrO_3$ nonionic phases could be created in-situ within the via and adjacent extended electrolyte through addition of SrO powder to the interconnect inks in excess of the stoichiometric ratio of 1 mole SrO to 1 mole $ZrO_2$. In one form, a lower limit is approximately 15-20 mole % SrO based on the ceramic phase, in order to form SrZrO3 to reduce YSZ below the percolation threshold. In other embodiments, other lower limits may apply. In one form, an upper limit is about 50-60 mole % SrO based on the ceramic phase (SrO+ZrO2). In other embodiments, other upper limits may apply.

In yet still other embodiments, all or portions interconnect 16 or other interconnects or vias may include a content of rare earth oxide at the stoichiometric ratio with YSZ to lead to full reactivity to $(M_{RE})_2Zr_2O_7$.

Firing temperatures for using a reactant phase to form the non-ionic conducting ceramic phases during firing of the fuel cell may vary with the needs of the particular application. Considerations include, for example and without limitation, the sinterability of different materials, powder particle size, specific surface area. Other material and/or processing parameters may also affect the selected firing temperature. For example, If the temperature is too low, the electrolyte may have higher porosity and cause leakage. If the temperature is too high, it may cause other issues, such as too high an anode density, which may reduce electrochemical activity, or may cause substrate dimensional changes, etc. Hence, the actual firing temperature for purposes of using one or more reactant phases to form one or more non-ionic conducting ceramic phases may vary as between applications. In one form, the firing temperature may be 1385° C. In some embodiments, the firing temperature may be in the range of 1370° C. to 1395° C. In other embodiments, the firing temperature may be in the range of 1350° C. to 1450° C. In still other embodiments, the firing temperature may be outside the range of 1350° C. to 1450° C. Processing steps to form the one or more non-ionic conducting ceramic phases may include preparing a composition including the rare earth oxide, YSZ and a precious metal, forming the interconnect/via(s), firing the composition at the desired temperature, e.g., at a temperature or within a temperature range set forth above, and holding the composition at the firing temperature for a desired period, e.g., in the range of 1-5 hours. In embodiments wherein all or portions of the fuel cell are formed by screen printing, the method may include preparing a screen printable ink that incorporates the rare earth oxide, YSZ and the precious metal; printing the interconnect/via(s); drying the ink; firing the printed interconnect/via(s) at the desired temperature, e.g., at a temperature or within a temperature range set forth above; and holding the composition at the firing temperature for a desired period, e.g., in the range of 1-5 hours.

In additional embodiments, other non-ionic conducting phases or reactant phases may be employed to minimize the ionic conductivity of the interconnect.

The following Tables 1-8 provide compositional information for some aspects of non-limiting experimental fuel cell and fuel cell component examples produced in accordance with some aspects of some embodiments of the present invention. It will be understood the present invention is in no way limited to the examples provided below. The columns entitled "General Composition" illustrate some potential compositional ranges, including some preferred ranges, for some materials described herein, whereas, the columns entitled "Specific Composition" illustrates the materials used in the test articles/materials.

TABLE 1

|  | (w/o ceramic seal) | |
| --- | --- | --- |
|  | General Composition | Specific Composition |
| Anode | NiO—YSZ (NiO = 55-75 wt %) |  |
| Anode conductive layer | Pd—Ni—YSZ |  |
| Cathode | $La_{(1-x)}Sr_xMnO_{(3-d)}$ (x = 0.1-0.3)—3YSZ |  |
| Cathode conductive layer | Pd—$La_{(1-x)}Sr_xMnO_{(3-d)}$ (x = 0.1-0.3) |  |
| Electrolyte | 3YSZ | 3YSZ |

TABLE 1-continued (w/o ceramic seal)

| | General Composition | Specific Composition |
|---|---|---|
| Blind primary conductor | $x$Pd(100 − $x$)Pt—YSZ ($x$ = 35-65 wt ratio, alloy is 35-80 v %) | 31.1% Pd, 31.1% Pt, 24.4% 3YSZ |
| Auxiliary conductor on anode side | $x$Pd(100 − $x$)Pt—YSZ ($x$ = 35-65 wt ratio, alloy is 35-80 v %) | 31.1% Pd, 31.1% Pt, 24.4% 3YSZ |
| Auxiliary conductor on cathode side | Pd—La$_{(1-x)}$Sr$_x$MnO$_{(3-d)}$ ($x$ = 0.1-0.3) | |
| Substrate | MgO—MgAl$_2$O$_4$ | 69.4% MgO, 30.6% MgAl$_2$O$_4$ |
| Substrate surface modification layer | 3-8 mol % Y$_2$O$_3$—ZrO$_2$ | 8YSZ |
| Ceramic seal | N/A | N/A |
| Cell ASR, ohm-cm$^2$ | | 0.375 |
| Interconnect ASR, ohm-cm$^2$ | | 0.027 |
| Test duration, hrs | | 860 |

Examples: TCT23 (STC13-3): blind primary interconnect is long strip design FIG. 4

TABLE 2

(w/o ceramic seal)

| | General Composition | Specific Composition |
|---|---|---|
| Anode | NiO—YSZ (NiO = 55-75 wt %) | |
| Anode conductive layer | Pd—Ni—YSZ | |
| Cathode | La$_{(1-x)}$Sr$_x$MnO$_{(3-d)}$ ($x$ = 0.1-0.3)—3YSZ | |
| Cathode conductive layer | Pd—La$_{(1-x)}$Sr$_x$MnO$_{(3-d)}$ ($x$ = 0.1-0.3) | |
| Electrolyte | 3YSZ | 3YSZ |
| Blind primary conductor | $x$Pd(100 − $x$)Pt—YSZ ($x$ = 35-65 wt ratio, alloy is 35-80 v %) | 31.1% Pd, 31.1% Pt, 24.4% 3YSZ |
| Auxiliary conductor on anode side | $x$Pd(100 − $x$)Pt—YSZ ($x$ = 35-65 wt ratio, alloy is 35-80 v %) Pd—La$_{(1-x)}$Sr$_x$MnO$_{(3-d)}$ ($x$ = 0.1-0.3) | 31.1% Pd, 31.1% Pt, 24.4% 3YSZ |
| Substrate | MgO–MgAl$_2$O$_4$ | 69.4% MgO, 30.6% MgAl$_2$O$_4$ |
| Substrate surface modification layer | 3-8 mol % Y$_2$O$_3$—ZrO$_2$ | 8YSZ |
| Ceramic seal | | N/A |
| cell ASR, ohm-cm$^2$ | | 0.30 |
| Interconnect ASR, ohm-cm$^2$ | | 0.02 |
| Test duration, hrs | | 3500 |

Examples: PCT11(PC08-2/3): blind primary interconnect is via design FIG. 6

TABLE 3

(with ceramic seal)

| | General Composition | Specific Composition |
|---|---|---|
| Anode | NiO—YSZ (NiO = 55-75 wt %) | |
| Anode conductive layer | Pd—Ni—YSZ | |
| Cathode | La$_{(1-x)}$Sr$_x$MnO$_{(3-\delta)}$($x$ = 0.1-0.3)—3YSZ | |
| Cathode conductive layer | Pd—La$_{(1-x)}$Sr$_x$MnO$_{(3-\delta)}$ ($x$ = 0.1-0.3) | |
| Electrolyte | 3YSZ | 3YSZ |
| Blind primary conductor | Pd—Ni—YSZ | 76.5% Pd, 8.5% Ni, 15% 3YSZ |
| Auxiliary conductor on anode side | Pd—Ni—YSZ | 76.5% Pd, 8.5% Ni, 15% 3YSZ |
| Auxiliary conductor on cathode side | Pd—La$_{(1-x)}$Sr$_x$MnO$_{(3-\delta)}$ ($x$ = 0.1-0.3) | |
| Substrate | MgO—MgAl$_2$O$_4$ | 69.4% MgO, 30.6% MgAl$_2$O$_4$ |
| Substrate surface modification layer | 3-8 mol % Y$_2$O$_3$—ZrO$_2$ | 8YSZ |
| Ceramic seal | 3-5 mol % Y$_2$O$_3$—ZrO$_2$, or 4-6 mol % Sc$_2$O$_3$—ZrO$_2$ | 3YSZ |
| cell & interconnect ASR, ohm-cm$^2$ | | 0.50 |
| Test duration, hrs | | 1200 |

Examples: TCT2: blind primary interconnect is long strip design FIG. 8

TABLE 4

(Pd—NTZ as chemical barrier)

| | General Composition | Specific Composition |
|---|---|---|
| Anode | NiO—YSZ (NiO = 55-75 wt %) | |
| Anode conductive layer | Pd—NiO—(Mg$_{0.42}$,Ni$_{0.58}$)Al$_2$O$_4$ | |
| Cathode | La$_{(1-x)}$Sr$_x$MnO$_{(3-\delta)}$($x$ = 0.1-0.3)—3YSZ | |
| Cathode conductive layer | La$_{(1-x)}$Sr$_x$MnO$_{(3-d)}$ ($x$ = 0.1-0.3) | |

TABLE 4-continued

(Pd—NTZ as chemical barrier)

| | General Composition | Specific Composition |
|---|---|---|
| Electrolyte | 3-8 mol % $Y_2O_3$—$ZrO_2$, or 4-11 mol % $Sc_2O_3$—$ZrO_2$ | 3YSZ |
| Blind primary conductor | $x$Pd(100 − x)Pt—YSZ (x = 35-65 wt ratio, alloy is 35-80 v %) | 31.1% Pd, 31.1% Pt, 24.4% 3YSZ |
| Chemical barrier on anode side | $x$Pd—(100 − x) NTZ* (x = 10-40) | 15% Pd, 19% NiO, 66% NTZ |
| Auxiliary conductor on cathode side | La(1 − x)Sr$x$MnO(3 − d) (x = 0.1-0.3) | |
| Substrate | MgO—MgAl$_2$O$_4$ | 69.4% MgO, 30.6% MgAl$_2$O$_4$ |
| Substrate surface modification layer | 3-8 mol % $Y_2O_3$—$ZrO_2$ | 8YSZ |
| Ceramic seal | N/A | N/A |
| Cell ASR, ohm-cm^2 | | 0.35 |
| Interconnect ASR, ohm-cm^2 | | 0.02-0.05 |
| Test duration, hrs | | 1400 |

*NTZ: 73.6 wt %NiO, 20.0%$TiO_2$, 6.4% YSZ

Examples: PCT14B (PC11-4), blind vias, FIG. 11

TABLE 5 wt % (GDC10 as chemical barrier)

| | General Composition | Specific Composition |
|---|---|---|
| Anode | NiO—YSZ (NiO = 55-75 wt %) | |
| Anode conductive layer | Pd—NiO—(Mg$_{0.42}$,Ni$_{0.58}$)Al$_2$O$_4$ | |
| Cathode | La$_{(1-x)}$Sr$_x$MnO$_{(3-\delta)}$(x = 0.1-0.3)—3YSZ | |
| Cathode conductive layer | La$_{(1-x)}$Sr$_x$MnO$_{(3-d)}$ (x = 0.1-0.3) | |
| Electrolyte | 3-8 mol % $Y_2O_3$—$ZrO_2$, or 4-11 mol % $Sc_2O_3$—$ZrO_2$ | 3YSZ |
| Blind primary conductor | $x$Pd—(100 − x)YSZ (x = 70-90 weight ratio) | 85% Pd, 15% 3YSZ |
| Chemical barrier on anode side | Doped Ceria | (Gd$_{0.1}$,Ce$_{0.9}$)O$_2$ |
| Auxiliary conductor on cathode side | La$_{(1-x)}$Sr$_x$MnO$_{(3-d)}$ (x = 0.1-0.3) | |
| Substrate | MgO—MgAl$_2$O$_4$ | 69.4% MgO, 30.6% MgAl$_2$O$_4$ |
| Substrate surface modification layer | 3-8 mol % $Y_2O_3$—$ZrO_2$ | 8YSZ |
| Ceramic seal | 3-5 mol % $Y_2O_3$—$ZrO_2$, or 4-6 mol % $Sc_2O_3$—$ZrO_2$ | 3YSZ |
| Cell ASR, ohm-cm^2 | | 0.24 |
| Interconnect ASR, ohm-cm^2 | | 0.04-0.05 |
| Test duration, hrs | | 1340 |

Examples: PCT55A (PC28-2) for FIG. 12

TABLE 6 wt %

| | General Composition | Specific Composition |
|---|---|---|
| Anode | NiO—YSZ (NiO = 55-75 wt %) | |
| Anode conductive layer | Pd—NiO—(Mg$_{0.42}$,Ni$_{0.58}$)Al$_2$O$_4$ | |
| Cathode | La$_{(1-x)}$Sr$_x$MnO$_{(3-\delta)}$(x = 0.1-0.3)—3YSZ | |
| Cathode conductive layer | La$_{(1-x)}$Sr$_x$MnO$_{(3-d)}$ (x = 0.1-0.3), or LaNi$_{0.6}$Fe$_{0.4}$O$_3$ | |
| Electrolyte | 4-11 mol % $Sc_2O_3$—$ZrO_2$ | 6ScSZ |
| Blind primary conductor | $x$Pd(100 − x)Pt—YSZ (x = 35-65 wt ratio, alloy is 35-80 v %) | 31.1% Pd, 31.1% Pt, 24.4% 3YSZ |
| Chemical barrier on anode side | Doped Ceria | (Gd$_{0.1}$,Ce$_{0.9}$)O$_2$ |
| Auxiliary conductor on cathode side | La$_{(1-x)}$Sr$_x$MnO$_{(3-d)}$ (x = 0.1-0.3), or LaNi$_{0.6}$Fe$_{0.4}$O$_3$ | |
| Substrate | MgO—MgAl$_2$O$_4$ | 69.4% MgO, 30.6% MgAl$_2$O$_4$ |
| Substrate surface modification layer | 3-8 mol % $Y_2O_3$—$ZrO_2$ | 8YSZ |
| Ceramic seal | 3-5 mol % $Y_2O_3$—$ZrO_2$, or 4-6 mol % $Sc_2O_3$—$ZrO_2$ | 3YSZ |
| Cell ASR, ohm-cm^2 | | 0.24 |
| Interconnect ASR, ohm-cm^2 | | 0.05-0.06 |
| Test duration, hrs | | 8000 |

Examples: PCT63A&B For FIG. 16

TABLE 7

| | General Composition | Specific Composition |
|---|---|---|
| Anode | | |
| Anode conductive layer | | |
| Cathode | | |
| Cathode conductive layer | | |
| Electrolyte | | |
| Blind primary conductor | Pt—YSZ—SrZrO3 | 78.8% Pt—11.1% 3YSZ—10.1% SrZrO3 |
| Auxiliary conductor on anode side | | |
| Auxiliary conductor on cathode side | | |
| Substrate | | |
| Substrate surface modification layer | | |
| Ceramic seal | | |
| Cell ASR, ohm-cm$^2$ | | |
| Interconnect ASR, ohm-cm$^2$ | | |

Examples: not tested in an actual SOFC test article, pellet formulation

TABLE 8

| | General Composition | Specific Composition |
|---|---|---|
| Anode | NiO—YSZ (NiO = 55-75 wt %) | |
| Anode conductive layer | Pd—NiO—(Mg$_{0.42}$,Ni$_{0.58}$)Al$_2$O$_4$ | |
| Cathode | La$_{(1-x)}$Sr$_x$MnO$_{(3-\delta)}$(x = 0.1-0.3)—3YSZ | |
| Cathode conductive layer | La$_{(1-x)}$Sr$_x$MnO$_{(3-d)}$ (x = 0.1-0.3) | |
| Electrolyte | 3-8 mol % Y$_2$O$_3$—ZrO$_2$ | 3YSZ |
| Blind primary conductor | Pt—Pd—YSZ—La$_2$O$_3$ | 36% Pt—36% Pd—25.2% 3YSZ—2.8% La$_2$O$_3$ |
| Auxiliary conductor on anode side | Pt—Pd—YSZ—La$_2$O$_3$ | 36% Pt—36% Pd—25.2% 3YSZ—2.8% La$_2$O$_3$ |
| Auxiliary conductor on cathode side | La$_{(1-x)}$Sr$_x$MnO$_{(3-d)}$ (x = 0.1-0.3) | |
| Substrate | MgO—MgAl$_2$O$_4$ | 69.4% MgO, 30.6% MgAl$_2$O$_4$ |
| Substrate surface modification layer | 3-8 mol % Y$_2$O$_3$—ZrO$_2$ | 8YSZ |
| Ceramic seal | 3-5 mol % Y$_2$O$_3$—ZrO$_2$, or 4-6 mol % Sc$_2$O$_3$—ZrO$_2$ | 3YSZ |
| Cell ASR, ohm-cm$^2$ | | 0.3-0.34 |
| Interconnect ASR, ohm-cm$^2$ | | 0.04-0.07 |

Examples: PCT57

Embodiments of the present invention include a fuel cell system, comprising a plurality of electrochemical cells, each electrochemical cell formed of an anode, a cathode spaced apart from the anode, and an electrolyte disposed between the anode and the cathode; an interconnect electrically coupling a pair of electrically adjacent electrochemical cells, the interconnect electrically coupling the anode of one electrochemical cell to the cathode of the other electrochemical cell; an electrode conductive layer electrically coupled to the interconnect; and a separation feature configured to space apart the electrode conductive layer from the electrolyte layer.

In a refinement, the electrode conductive layer is a cathode conductive layer electrically coupled to the cathode and to the interconnect.

In another refinement, the interconnect includes a portion embedded within the electrolyte.

In yet another refinement, the separation feature is configured to prevent the formation of a parasitic cell formed of the electrode conductive layer, the electrolyte layer and the interconnect.

In still another refinement, the electrode conductive layer is a cathode conductive layer.

In yet still another refinement, the separation feature is a gap between the electrode conductive layer and the electrolyte layer.

In a further refinement, the separation feature is an insulator disposed between the electrode conductive layer and the electrolyte layer.

In a yet further refinement, the insulator is formed of non-insulating materials.

In a still further refinement, the insulator is aluminum oxide (Al$_2$O$_3$).

In a yet still further refinement, the insulator is pyrochlore.

In another further refinement, the insulator is at least one of La$_2$Zr$_2$O$_7$, Pr$_2$Zr$_2$O$_7$, and SrZrO$_3$.

Embodiments of the present invention include a fuel cell system, comprising: a cathode of a first electrochemical cell; an electrolyte; an anode of a second electrochemical cell spaced apart from the cathode by the electrolyte; a cathode conductive layer adjoining the cathode; an interconnect configured to conduct free electrons between the anode and the cathode, wherein the interconnect adjoins both the cathode conductive layer and the electrolyte; and a separation feature configured to separate the electrode conductive layer from the electrolyte layer.

In a refinement, the interconnect includes a portion embedded within the electrolyte.

In another refinement, the separation feature is configured to prevent the formation of a parasitic cell formed of the cathode conductive layer, the electrolyte and the interconnect.

In yet another refinement, the separation feature is a gap between the electrode conductive layer and the electrolyte layer.

In still another refinement, the separation feature is an insulator disposed between the electrode conductive layer and the electrolyte layer.

In yet still another refinement, the insulator is formed of non-insulating materials.

In a further refinement, the insulator is aluminum oxide ($Al_2O_3$).

In a yet further refinement, the insulator is pyrochlore.

In a still further refinement, the insulator is at least one of $La_2Zr_2O_7$, $Pr_2Zr_2O_7$, and $SrZrO_3$.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A fuel cell system, comprising:
   a plurality of electrochemical cells, each electrochemical cell formed of an anode, a cathode spaced apart from said anode, and an electrolyte disposed between said anode and said cathode;
   an interconnect electrically coupling a pair of electrically adjacent electrochemical cells, said interconnect electrically coupling said anode of one electrochemical cell to said cathode of the other electrochemical cell;
   an electrode conductive layer distinct from and electrically coupled to said interconnect; and
   a separation feature configured to horizontally space apart the electrode conductive layer from the adjacent electrolyte, such that a spacing therebetween is a horizontal thickness of the separation feature;
   wherein said electrode conductive layer is a cathode conductive layer electrically coupled to said cathode;
   wherein the cathode conductive layer overlays, at least in part, the cathode, such that the cathode conductive layer and cathode are vertically layered;
   wherein the cathode conductive layer is configured in material composition and in microstructure for chemical compatibility with the cathode and to pass oxygen ($O_2$) therethrough to the cathode.

2. The fuel cell system of claim 1, wherein said interconnect includes a portion embedded within said electrolyte.

3. The fuel cell system of claim 1, wherein the separation feature is a gap such that the spacing between the corresponding electrode conductive layer and electrolyte is unobstructed and a fluid may flow unimpeded within the gap.

4. The fuel cell system of claim 1, wherein the separation feature is an insulator disposed between said electrode conductive layer and said electrolyte.

5. The fuel cell system of claim 4, wherein the insulator is formed of non-conductive materials.

6. The fuel cell system of claim 4, wherein the insulator is aluminum oxide ($Al_2O_3$).

7. The fuel cell system of claim 4, wherein the insulator is pyrochlore.

8. The fuel cell system of claim 4, wherein the insulator is at least one of $La_2Zr_2O_7$, $Pr_2Zr_2O_7$, and $SrZrO_3$.

9. A fuel cell system, comprising:
   a cathode of a first electrochemical cell;
   an electrolyte of the first electrochemical cell;
   an anode of a second electrochemical cell;
   an electrolyte of the second electrochemical cell, wherein the electrolyte of the second electrochemical cell is separate from the electrolyte of the first electrochemical cell;
   a cathode conductive layer adjoining said cathode, and the cathode conductive layer overlaying the cathode at least in part such that the cathode conductive layer and cathode are vertically layered;
   an interconnect configured to conduct free electrons between said anode and said cathode, wherein said interconnect is distinct from and adjoins each of said cathode conductive layer, said electrolyte of the first electrochemical cell and said electrolyte of the second electrochemical cell; and
   a separation feature configured to separate said cathode conductive layer from said electrolyte of the second electrochemical cell and extending horizontally between the cathode conductive layer and the electrolyte of the second electrochemical cell such that a spacing therebetween is a horizontal thickness of the separation feature.

10. The fuel cell system of claim 9, wherein said interconnect includes a conductor having blind ends disposed within the electrolyte, wherein the conductor is completely embedded within said electrolyte.

11. The fuel cell system of claim 9, wherein said separation feature is configured to prevent the formation of a parasitic cell formed of said cathode conductive layer, said electrolyte and said interconnect.

12. The fuel cell system of claim 9, wherein the separation feature is a gap and a fluid may flow unimpeded within the gap.

13. The fuel cell system of claim 9, wherein the separation feature is an insulator disposed between said cathode conductive layer and said electrolyte.

14. The fuel cell system of claim 13, wherein the insulator is formed of non-conductive materials.

15. The fuel cell system of claim 13, wherein the insulator is aluminum oxide ($Al_2O_3$).

16. The fuel cell system of claim 13, wherein the insulator is pyrochlore.

17. The fuel cell system of claim 13, wherein the insulator is at least one of $La_2Zr_2O_7$, $Pr_2Zr_2$, and $SrZrO_7$.

18. The fuel cell system of claim 9, wherein the cathode conductive layer is in direct electrical communication with the cathode without any intervening components disposed electrically therebetween.

19. The fuel cell system of claim 9, wherein the cathode conductive layer substantially overlays the cathode, and is in direct physical contact with the cathode.

20. The fuel cell system of claim 9 wherein the electrolyte is a component of each electrochemical cell individually and is not shared among a plurality of electrochemical cells.

21. A fuel cell system, comprising:
a plurality of electrochemical cells having an electrolyte, each electrochemical cell having an anode and a cathode, wherein the electrolyte is disposed between the anode and the cathode;
each electrochemical cell further having:
a cathode conductive layer in electrical communication with the cathode wherein the cathode conductive layer at least partially overlays the cathode; and
a separation feature disposed between the cathode conductive layer and the electrolyte in a second electrochemical cell that spaces the cathode conductive layer apart from the electrolyte,
wherein a first electrochemical cell of the plurality of electrochemical cells is disposed adjacent to the second electrochemical cell of the plurality of electrochemical cells in a first direction; wherein the electrolyte has a major dimension extending in the first direction and a minor dimension extending in a second direction normal to the first direction; wherein the separation feature has a first end and a second end; wherein the first end is spaced apart from the second end in the first direction; and wherein the second end is immediately adjacent to and bounded by the electrolyte, such that a spacing between the cathode conductive layer and the electrolyte in the first direction is a thickness of the separation feature in the first direction and extends from the first end and to the second end of the separation feature.

22. The fuel cell system of claim 21, further comprising an interconnect, wherein the cathode conductive layer forms a portion of the interconnect; and wherein the separation feature is adjacent to and bounded on opposite ends by both the cathode conductive layer and the electrolyte.

23. The fuel cell system of claim 22, wherein the electrolyte is subdivided into a plurality of separate and unconnected electrolyte portions to form a plurality of electrochemical cells; and wherein the separation feature of one electrochemical cell is adjacent to and bounded by the electrolyte portion of an adjacent electrochemical cell in the second direction.

24. The fuel cell system of claim 21, wherein the separation feature is adjacent to and in contact with the cathode conductive layer; and wherein the separation feature is adjacent to and in contact with the electrolyte of an adjacent electrochemical cell.

25. The fuel cell system of claim 1, wherein the separation feature is disposed between and bounded by the cathode conductive layer, the interconnect and the electrolyte.

26. The fuel cell system of claim 9, further comprising an interconnect for electrically coupling a pair of electrically adjacent electrochemical cells, wherein the cathode conductive layer is in direct electrical communication with the interconnect and/or forms a part of the interconnect.

27. The fuel cell system of claim 21, wherein the fuel cell system is a planar fuel cell system having a porous substrate through which at least one of a fuel and an oxidant are supplied to the electrochemical cells; and wherein the electrolyte, the anode and the cathode are supported on the substrate and disposed on the same side of the substrate.

28. The fuel cell system of claim 21, wherein the separation feature is a gap, wherein the gap is bounded by the electrolyte on one end and extends from the electrolyte in the first direction to said electrode conductive layer; and a fluid may flow unimpeded within the gap.

* * * * *